(12) United States Patent
MacHardy et al.

(10) Patent No.: US 7,603,529 B1
(45) Date of Patent: Oct. 13, 2009

(54) METHODS, SYSTEMS, AND COMPUTER PROGRAM PRODUCTS FOR MAPPED LOGICAL UNIT (MLU) REPLICATIONS, STORAGE, AND RETRIEVAL IN A REDUNDANT ARRAY OF INEXPENSIVE DISKS (RAID) ENVIRONMENT

(75) Inventors: Earle MacHardy, Durham, NC (US); David Harvey, Newton, MA (US); Dennis Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 593 days.

(21) Appl. No.: 11/387,129

(22) Filed: Mar. 22, 2006

(51) Int. Cl.
*G06F 12/02* (2006.01)
*G06F 12/16* (2006.01)

(52) U.S. Cl. .................. 711/162; 711/114; 711/170; 707/204

(58) Field of Classification Search .............. 714/5, 714/6; 711/114, 162, 170; 707/204
See application file for complete search history.

(56) References Cited

U.S. PATENT DOCUMENTS

| | | | |
|---|---|---|---|
| 5,574,855 | A | 11/1996 | Rosich et al. |
| 5,822,780 | A | 10/1998 | Schutzman |
| 6,507,890 | B1 | 1/2003 | Morley et al. |
| 6,578,160 | B1 | 6/2003 | MacHardy, Jr. et al. |
| 6,594,775 | B1 | 7/2003 | Fair |
| 6,678,788 | B1 | 1/2004 | O'Connell |
| 6,691,209 | B1 | 2/2004 | O'Connell |
| 6,718,481 | B1 | 4/2004 | Fair |
| 6,813,623 | B2 | 11/2004 | Wilding et al. |
| 6,865,157 | B1 | 3/2005 | Scott et al. |
| 6,944,133 | B2 | 9/2005 | Wisner et al. |
| 7,096,330 | B1 * | 8/2006 | Root et al. ................. 711/162 |
| 7,103,796 | B1 * | 9/2006 | Kekre et al. .................... 714/6 |
| 2004/0153710 | A1 | 8/2004 | Fair |
| 2004/0153749 | A1 | 8/2004 | Schwarm et al. |
| 2004/0254964 | A1 * | 12/2004 | Kodama et al. ............. 707/204 |
| 2006/0053260 | A1 * | 3/2006 | Kodama ..................... 711/162 |
| 2006/0107013 | A1 * | 5/2006 | Ripberger .................. 711/170 |

OTHER PUBLICATIONS

Commonly-assigned, co-pending U.S. Appl. No. 11/324,553 for "Methods, Systems, and Computer Program Products for Dynamic Mapping of Logical Units in a Redundant Array of Inexpensive Disks (RAID) Environment," (Unpublished, filed Jan. 3, 2006).

* cited by examiner

*Primary Examiner*—Shane M Thomas
(74) *Attorney, Agent, or Firm*—Jenkins, Wilson, Taylor & Hunt, P.A.

(57) ABSTRACT

Methods, systems, and computer program products for MLU replication, storage, and retrieval in a RAID environment are disclosed. According to one method, a data storage extent pool representing a portion of a RAID array is provisioned. A replica vault including a second data storage extent pool and representing a portion of a RAID array is provisioned. An MLU for allocating data storage extents from the data storage extent pool is created and, in response to a data write operation, a data storage extent from the data storage extent pool is allocated and data associated with the data write operation is stored in the data storage extent. The MLU is replicated to create a second MLU by allocating a second data storage extent in the second data storage extent pool in the replica vault and copying data stored in the data storage extent to the second data storage extent.

43 Claims, 11 Drawing Sheets

METHODS, SYSTEMS, AND COMPUTER PROGRAM PRODUCTS FOR MAPPED LOGICAL UNIT (MLU) REPLICATIONS, STORAGE, AND RETRIEVAL IN A REDUNDANT ARRAY OF INEXPENSIVE DISKS (RAID) ENVIRONMENT

RELATED APPLICATIONS

This application relates to U.S. patent application Ser. No. 11/324,553, filed Jan. 3, 2006; the disclosure of which is incorporated herein by reference in its entirety.

TECHNICAL FIELD

The subject matter described herein relates to logical unit (LUN) mapping of memory arrays. More particularly, the subject matter described herein relates to methods, systems, and computer program products for mapped logical unit (MLU) replication, storage, and retrieval in a redundant array of inexpensive disks (RAID) environment.

BACKGROUND

RAID groups are logical representations of disk arrays created by binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes.

Applications access and store data incrementally by use of logical storage array partitions, known as logical units (LUNs). LUNs are exported from a RAID array for use at the application level. For conventional systems, LUNs always map to physically provisioned contiguous storage space. This physical provisioning results from the fact that traditional LUN mapping technologies bind LUNs from RAID groups using static mapping. Static mapping provides that a LUN is defined by a start position in a RAID group and that the LUN extends for its size from that position contiguously in the RAID group's address space. This static mapping yields a logical unit mapping of 1:1 for logical to physical mapping of blocks from some start point in the RAID group's address space on the array.

Because this mapping was simple, it was viewed as the most efficient way to represent a logical unit in any system from the point of view of raw input/output (I/O) performance. The persistent definition of the logical unit as a contiguously provisioned unit made it manageable for storage and retrieval, but imposed limits on the scalability of data storage systems.

However, while the persistent nature of the LUN defined in this manner has been manageable for storage and retrieval, it has become inefficient with the increased usage of array replication features. Array replication features may be characterized by an environment where different versions of data must be maintained and moved around a system quickly and in a transparent manner. Control of the placement of data has become more important. The ability to quickly and efficiently represent different versions of a LUN is also starting to become a more important factor to optimize due to customer needs for quick data recovery after system failures.

Storage space is a consideration of growing concern. As systems increase in size and complexity, storage requirements increase proportionally to the information that must be archived for replication, storage, and retrieval operations. Snapshots and clones are often used in storage systems to identify changes in the storage contents over time. When snapshots are used for point-in-time copies, LUNs are referenced by the snapshot. When data changes are requested for data regions associated with the LUN, they are tracked by the snapshot by the allocation of new storage extents to store the original data referenced by the LUN. The original data is copied to the newly allocated storage extents and the requested data change is written to the storage extents referenced by the LUN. When clones are used, LUNs are copied in their entirety to new storage regions. Cloning allows LUNs to be copied in their entirety to new storage space for archival and restoration purposes. The storage requirements associated with conventional bulk data archival typically limit concurrent restore points due to limitations in available disk space.

As an example of both temporal and storage limitations in conventional systems, convention LUN architectures do not provide a mechanism for sharing of data segments on the array. As described above, snapshots are cloned copies of LUNs and snapshots must be copied in their entirety before they can be used. By not allowing data sharing, storage limitations, as described above, exist in conventional systems for the number of restore points that may be economically maintained. Further, in order to effectively have a valid restore point, the entire LUN must be copied. Any change in data stored in a storage extent within a LUN will result in loss of a restore point for any data changed prior to completion of the cloning operation. Accordingly, both temporal and storage limitations exist in conventional systems due to a lack of data sharing capabilities.

As another example of both temporal and storage limitations for conventional LUN operations, conventional systems use bitmaps to track changed storage locations. Given the increasing size of certain systems, memory is consumed in proportional to the size of the bitmaps that are required to track changes. This increasing memory usage imposes a need to use paging schemes for change tracking bitmaps which results in increased latency during paging operations. Accordingly, for operations related to system information processing for replication, storage, and retrieval of snapshots, both a temporal and a storage limitations result.

Temporal limitations also exist in conventional systems for clone and snapshot archival. In order to preserve the original structure of the LUN for that point in time, blocks are copied on the first write reference (copy on first write) to a special save area reserved to hold these "historical" blocks of data. This copy involves a read/write cycle that causes significant performance disruption just after the point-in-time copy is created against an actively changing production LUN. This disruption may continue for some amount of time until most of the copying is completed and sometimes this can last for hours. In an array environment where snapshots are constantly being created, the performance impacts of conventional systems become significant.

Another source of temporal limitation for conventional systems relates to an operation known as silvering. Silvering is a process of copying data from one mirror image to another to get them into synchronization. Conventional clones are also required to use completely new storage for clone creation. Clones often have to be silvered before they can be used.

Accordingly, in light of these difficulties associated with conventional RAID array LUN replication, storage, and retrieval, there exists a need for improved methods, systems, and computer program products for mapped logical unit (MLU) replication, storage, and retrieval in a RAID environment.

SUMMARY

According to one aspect, the subject matter described herein comprises methods, systems, and computer program products for mapped logical unit (MLU) replication, storage, and retrieval in a redundant array of inexpensive disks (RAID) environment. One method includes provisioning a first data storage extent pool representing at least a portion of a RAID array and including at least one data storage extent, provisioning a replica vault including a second data storage extent pool including at least one data storage extent and representing at least a portion of a RAID array, creating a first mapped logic unit (MLU) for allocating data storage extents from the first data storage extent pool, in response to a first data write operation, allocating, using the first MLU, a first data storage extent from the first data storage extent pool and storing data associated with the first data write operation in the first data storage extent, and replicating the first MLU to create a second MLU by allocating a second data storage extent in the second data storage extent pool in the replica vault and copying the data stored in the first data storage extent to the second data storage extent.

The subject matter described herein for providing MLU replication, storage, and retrieval in a RAID environment may be implemented using a computer program product comprising computer executable instructions embodied in a computer-readable medium. Exemplary computer-readable media suitable for implementing the subject matter described herein include chip memory devices, disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
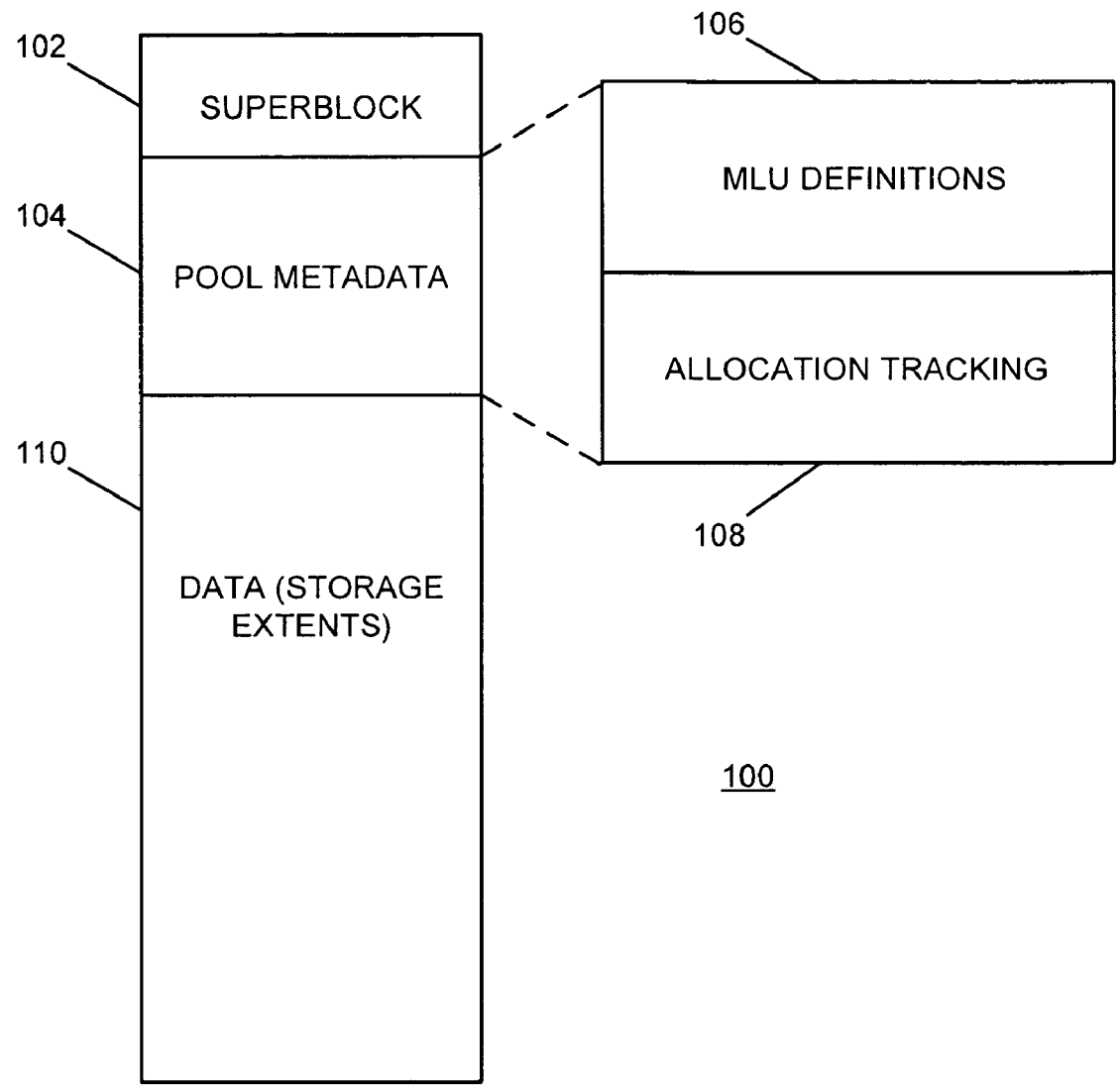
FIG. 1 is a block diagram of an exemplary storage extent pool according to an embodiment of the subject matter described herein.

In view of the problems described above with respect to statically provisioned LUNs and the associated limitations on replication, storage, and retrieval of the statically provisioned LUNs, the subject matter described herein allows for the replication, storage, and retrieval of dynamically provisioned mapped logical units (MLUs) in RAID arrays. Where previously LUNs were statically mapped to specific regions of a RAID array and the replication, storage, and retrieval of these statically mapped LUNs included several temporal and storage space limitations, the methods, systems, and computer program products described herein provide for temporal and storage space savings by replication, storage, and retrieval of MLUs within a RAID array environment. By adapting the replication, storage, and retrieval of storage units to use MLUs as a data allocation unit, as described herein, storage capacity and performance improvements may be realized.

In order to facilitate these storage capacity and performance improvements, a flexible address space mapping will be presented herein. The mapping allows for physically non-contiguous storage chunks to be dynamically linked together at time of use into a logically contiguous address space.

These dynamically provisioned storage chunks are referred to herein as "storage extents." Storage extents may be allocated as needed from a provisioned data extent storage pool. This pool may be a repository of storage extents that are available for dynamic allocation (e.g., dynamic provisioning). This pool may have properties much like a RAID group with storage extent granularity ranging from as small as two kilobytes per storage extent, for example, to a potential maximum, within a given pool, of the pool size minus overhead (pool size—overhead). Storage extents may be assigned from either contiguous or non-contiguous portions of a pool. However, based upon the description below, even discontinuous groupings may be represented as a logically contiguous address space. A default storage extent of 64 kb and a pool size of one terabyte will be used herein for simplicity of description. A disk array may have many different pools just as it may have many different RAID groups.

This pool overhead is referred to herein as pool metadata. The storage extents within the physical storage pool may be tracked by metadata data structures stored within the pool itself. While storage of the metadata within the pool is not a requirement, it serves a useful purpose of compartmentalizing the pool and its overhead. This compartmentalization may be helpful, for example, for scalability and for use in failure mode recovery. This metadata may take any form suitable for tracking allocation and ownership of the data extents.

A construct called a mapped logic unit (MLU) is used to allocate a data storage extent from a pool. An MLU has both behavioral capabilities for allocation of data storage extents from the pool and data structure and storage extent pointer manipulation capabilities for managing allocated data storage extents. An MLU may interface between an application and a pool of data storage extents to create a virtual address space for use by the application. This virtual address space may be allocated in an on-demand fashion when data is written by an application to the address space represented by the MLU. An MLU may be thought of as a replacement for the traditional LUN concept.

The MLU includes a reference to an address space mapping used to allow a dynamic, logically contiguous, but potentially physically non-contiguous, view of the RAID array's address space. In one exemplary implementation, an MLU may include a pointer construct storing a plurality of pointers to different data storage extents to which data has been written by an application. When an MLU is first allocated and associated with an application, it may be assigned a pool from which to draw storage extents. For ease of explanation, the description herein will consider an MLU to be capable of allocating storage space from one pool. However, an MLU may be capable of allocating storage space from multiple pools without departing from the scope of the subject matter described herein. An initial MLU definition may include a maximum size, or number of storage extents, that may be allocated by the MLU.

Pools, as collections of storage extents, may be thought of as aggregated logical units (ALUs). Pools may also be thought of as collections of ALUs, thereby providing variable granularity within the pool construct. By adding or removing ALUs from a pool, the pool may be increased or decreased over time, respectively, based upon system needs. By allowing variable granularity across a pool, storage extent size allocations may also be varied. Logical storage allocations may be created with a specified storage extent size that either matches, or is a multiple of, the minimum storage extent available within a pool. This variable allocation may be managed within the pool metadata so that MLU design may be simplified by allowing MLUs to view aggregated allocations as single storage extents. For simplicity, it will be assumed that an aggregated storage allocation is internally contiguous, though further abstractions of the concepts disclosed herein are possible and all are considered within the scope of the subject matter described herein.

As data extents are allocated by an MLU to its address space, allocation tracking information may be maintained at both the pool level and at the MLU level. Information relating to which MLUs have been created and which storage extents (or aggregations) have been allocated to each MLU may be stored as pool metadata. Thereby, storage extents may initially be sequentially allocated from the pool, and later allocated from noncontiguous space as MLU storage extents are returned to the pool. It should be noted that a defragmentation processes may be performed on a pool occasionally to allow alignment of storage extents and may be performed as a background operation, as will be described in more detail below.

MLU internal allocation tracking information is referred to herein as MLU metadata and, much like the pool metadata, may be stored within the MLU or may be stored in a separate set of data structures. The ordering of potentially discontinuous storage extents to form a logically contiguous address space within an MLU may be indexed within the MLU metadata. By storing this indexing within the MLU metadata (and, thereby, within the pool) it may be shared with other MLUs. By tracking alignment within the MLU metadata, this tracking may be partitioned from the pool metadata. By encapsulating alignment tracking as MLU metadata, MLUs may be more easily copied and referenced externally, as will be described in more detail below.

MLU metadata may be physically stored within data extents within the pool to aid in performance enhancement and recovery procedures or may be stored in another storage area. When stored within the pool, the MLU definitions may become part of the pool metadata. Again, as with pool metadata, storing MLU metadata within the pool may provide scalability enhancements.

Because there is no storage allocated to an MLU when it is created, the initial mapping of an MLU for a read operation may return zeros for any sectors that are read from its address space. When a write is performed to the MLU address space, a new storage extent may be allocated from the pool and assigned to the MLU. In the absence of any sharing of this storage extent, further writes to this area of the address space may use the existing storage extent to hold the new data. When sharing of storage extents exists, as will be described in more detail below, a new storage extent may be allocated for storage of new data when either sharing MLU receives a data write to the shared logical address space.

By allocating the storage extents on first write (e.g., allocate on first write), MLU physical storage space may be dynamically expanded or provisioned. When a storage extent is allocated by an MLU, the mapping associated with the MLU, both internally within MLU metadata and externally within pool metadata, may also be updated to reflect the allocation.

By using an allocate-on-first-write mechanism, an MLU may only contain enough storage extents to represent all data written by the user since the logical unit was created. This address space property may be termed sparseness. Sparseness means that parts of the mapping that do not specify a storage extent will, as described above, return a fixed value for that part of the address space, which for example, may be all zeros. This sparse property of the address space means that storage usage may be efficient with respect to the amount of data represented in the MLU because large sections of unwritten space (e.g., no data) in the MLU do not consume any space at all. Unlike traditional systems that provision all data storage for each application, MLUs may grow as applications write data to storage.

As described above, MLUs may be created with a maximum size, or number of storage extents, that may be allocated by the MLU. Pools may reserve the full number of storage extents available for an MLU when an MLU is created. In this way, by use of this full sparse provisioning, each MLU may be guaranteed to have the capacity and dimensionality available to it that was specified when it was created.

However, some applications may desire certain storage dimensions and never use the entire space. This inefficiency of storage referencing at the application level may be accommodated within the pool allocation mechanisms through a concept of thin provisioning. Thin provisioning may be allowed by a system administrator for any MLUs associated with an application when the administrator knows, or believes, that the application actually uses less storage than it desires. By reserving fewer than the maximum number of storage extents specified when an MLU was created, application storage use inefficiency may be improved at the MLU and pool levels without awareness of this thin provisioning at the application level. In the event that an application actually desires to write to more space than was thinly provisioned for the MLU, extra storage extents may be allocated from the pool, if any exist, and an alert may be issued to the administrator who may then increase the pool size or the level of thin provisioning for MLUs associated with this type of application.

Another benefit of the allocate-on-first-write mechanism relates to the fact that the MLU storage is built on demand. Because MLU storage is built on demand and returns a zero value for any read from unallocated storage, there is no need to zero unused storage space within the MLU. This is more efficient than other techniques of storage initialization, such as, for example, a technique known as fast binding which zero's storage areas as a background task. Accordingly, binding of MLU storage may be done on the fly in a real-time fashion without additional processor overhead or data write operations.

FIG. 1 illustrates an exemplary storage extent pool 100 depicting metadata storage extents and allocable storage extents. Superblock area 102 may be a controlling structure that describes the pool format. For example, superblock area 102 may contain information related to the chosen storage extent size as well as any ALU type aggregations that may be used within the pool. Pool metadata area 104 may store pool overhead data and data structures. As described above, pool metadata area 104 may be further broken down into MLU definition area 106 and allocation tracking area 108. Data storage extent pool 110 includes indexed allocable storage extents for allocation by MLUs. Data storage pool 110 may also optionally include the MLU metadata.

MLU definition area 106 may include, for example, MLU definitions that include storage extent pointers to MLUs that have been defined within data storage pool 110. When defined in this way, MLU metadata and MLU storage extent allocation sequence tracking information may be stored in the pool with the MLU. As an alternative, MLU definition area 106 may include MLU metadata storage and MLU storage extent allocation sequence tracking information in addition to the actual MLU definitions. Allocation tracking area 108 may include, for example, identifiers and related information for MLUs defined and storage extents allocated within the pool. Allocation tracking structures may be used within allocation tracking area 108 to store allocation information related to the allocation state of the storage extents in the pool. Allocation tracking area 108 may also include information related to how many MLUs reference a given block of storage.

For recovery purposes, pools may have three basic states: consistent, defragmenting, and inconsistent. A consistent pool may be considered available for allocation operations for the MLUs that are supported in that pool. A defragmenting pool may be available for use, but some blocks in the pool may be in the process of being rearranged, so the total pool capacity may register somewhat less than what would otherwise be available. An inconsistent pool is not available for allocation usage until it has transitioned into the consistent state. Absent hardware failure, pools may always be returned to a consistent state regardless of the current state of its inconsistency. Verification procedures may be run against a pool periodically to ensure the pool is in a consistent state and ready for use. Verification procedures may be run concurrently with normal operation in order to keep the pool online.

Tracking structures within allocation tracking area 108 may allow for storage extents to be shared from the pool by multiple MLUs. As will be described in more detail below, point-in-time copy storage may be greatly enhanced by tracking structures that allow storage extent references to be shared.

Two variations of allocation tracking will be described herein to allow sharing of storage extents by multiple MLUs. The variation chosen may be determined by the amount of memory and the amount of paging that is desired for a given system. Systems of moderate size and granularity, for example, up to eight terabytes with a granularity of two kilobytes per storage extent, may use a counter-based model. An owner-based model may be used for larger, more granular systems that surpass the threshold of either size or granularity. The counter-based model, which may be used in systems of moderate size and granularity, will use an allocation count field associated with each storage extent to track allocation of the storage extents to more than one MLU. The owner-based model, which may be used in large, highly granular systems, will use an allocation bitmap paired with an ownership bit within pointer structures of the MLUs to track allocation of the storage extents to more than one MLU. The ownership bit may be used to indicate which MLU "owns" a given allocated storage extent. The use of a bitmap in conjunction with an ownership bit may conserve space over use of the allocation count field variation for large, highly granular systems. Both variations will be described in more detail below.

Figures 2A, 2B:
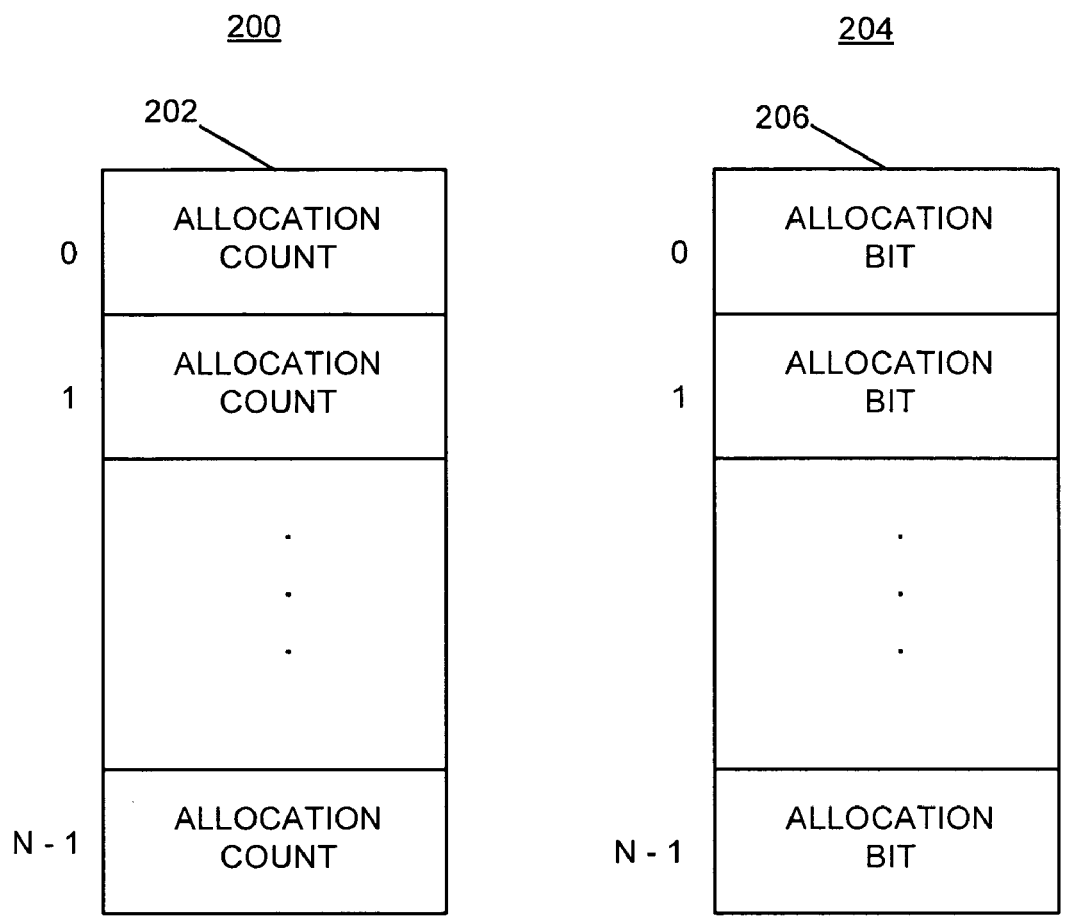
FIG. 2A is a block diagram of an exemplary dynamic allocation tracking structure for tracking dynamically allocated storage extents (blocks) within a storage extent pool for use in systems of moderate size and granularity according to an embodiment of the subject matter described herein.
FIG. 2B is a block diagram of an exemplary dynamic allocation tracking bitmap for tracking dynamically allocated storage extents (blocks) within a storage extent pool for large, highly granular systems according to an embodiment of the subject matter described herein.

FIG. 2A illustrates an exemplary dynamic allocation tracking structure 200 for tracking dynamically allocated storage extents (blocks) within a storage extent pool that may be used in systems of moderate size and granularity. Allocation tracking structure 200 may be stored in allocation tracking area 108 of storage extent pool 100. Allocation tracking structure 200 may include an array of allocation tracking units, each including an allocation count field 202. Allocation tracking structure 200 may map the blocks within a data pool, such as data storage pool 110 illustrated in FIG. 1, for allocation tracking. The allocation count field 202 associated with each storage extent may be incremented for each allocation and decremented for each deallocation, thereby allowing tracking of the number of MLUs that reference each storage extent. For example, as will be described in more detail below, when a copy of an MLU is made, the associated allocation count field 202 for all referenced blocks may be increased. Likewise, when an MLU is deleted, the associated MLU allocation count field 202 for all referenced blocks may be decreased. As another example, when a single block is allocated or deallocated by an MLU, the associated allocation count field 202 for the block may be increased or decreased, respectively. Initially, all allocation count fields 202 may be set to zero (0).

FIG. 2B illustrates an exemplary dynamic allocation tracking bitmap 204 for tracking dynamically allocated storage extents (blocks) within a storage extent pool that may be used in large, highly granular systems. Allocation tracking bitmap 204 may be stored in allocation tracking area 108 of storage extent pool 100. Allocation tracking bitmap 204 may include an array of allocation tracking units, each including an allocation bit field 206. Allocation tracking bitmap 204 may map the blocks within a data pool, such as data storage pool 110 illustrated in FIG. 1, for allocation tracking. As will be described in more detail below, the allocation bit field 206 associated with each storage extent may be set for each allocation. When used in conjunction with an ownership bit within the MLUs, as will be described in more detail below, tracking of the MLUs that reference each storage extent may be accomplished.

Figure 2C:
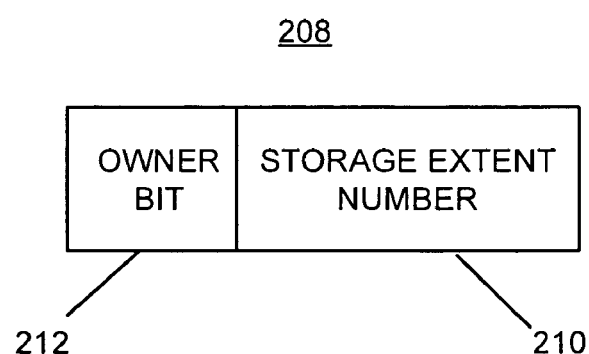
FIG. 2C illustrates an exemplary dynamic allocation tracking storage extent numbering structure for use in conjunction with an allocation tracking bitmap, such as the dynamic allocation tracking bitmap of FIG. 2B, for tracking dynamically allocated storage extents (blocks) within a storage extent pool for use in large, highly granular systems according to an embodiment of the subject matter described herein.

FIG. 2C illustrates an exemplary dynamic allocation tracking storage extent numbering structure 208 for use in conjunction with an allocation tracking bitmap, such as dynamic allocation tracking bitmap 204, for tracking dynamically allocated storage extents (blocks) within a storage extent pool that may be used in large, highly granular systems. When used in conjunction with dynamic allocation tracking bitmap 204, dynamic allocation tracking storage extent numbering structure 208 may track which MLU owns the referenced storage extent. A storage extent number field 210 may be used to reference the storage extents that make up the pool. An owner bit field 212 may be used and the bit set when an MLU that includes dynamic allocation tracking storage extent numbering structure 208 is the owner of the storage extent referenced within the storage extent number field 210. For example, when an MLU initially allocates a block, ownership may be assigned to that MLU and the owner bit field 212 set to indicate ownership. When an MLU is copied, the ownership of the blocks may or may not be changed, depending upon subsequent activities, as will be described in more detail below.

Dynamic allocation tracking storage extent numbering structure 208 may be embodied, for example, within an address-type field where the highest order bit is the owner bit field 212 and the remaining bits are the storage extent number field 210. For example, with a bit field width of sixty four bits, a storage extent number field 210 of sixty three bits is possible with the highest order bit representing owner bit field 212. For ease of description herein, owner bit field 212 and storage extent number field 210 will be shown as a colon-separated numeric pair. For example, a pairing that designates ownership of storage extent three (3) will be described herein with owner bit field 212 set to a one (1) and storage extent number field 210 set to three (3) (e.g., 1:3). Likewise, a pairing that designates no ownership of storage extent three (3) will be described herein with owner bit field 212 set to a zero (0) and storage extent number field 210 set to three (3) (e.g., 0:3).

In addition to benefits described above related to dynamic allocation and tracking of storage extents for initial data storage, archival and backup may be enhanced as well. Where previously, conventional systems used bitmaps to track changed storage locations, which imposed temporal limitations on system information processing for replication, storage, and retrieval operations, the subject matter described herein implements data structures that represent only changes between two MLUs. By adapting the tracking structures, as described herein, to account for changes between two MLUs, rather than operating on a storage extent basis, the amount of unchanged data that has to be moved for a copy when preserving a given replica of an MLU may be reduced. By building the tracking structures on storage extents, the tracking structures may be paged in and out of memory to provide large, finely grained mappings. Further, the use of the MLU for replication, storage, and retrieval operations may allow more efficient storage, memory, and processor usage.

In addition to the improvements described above, silvering costs may also be reduced by use of MLUs as a basis for clones. MLUs may be available for use as soon as they are created, even when being migrating between different spindles. A check against the integrity of an MLU may begin as soon as the clone is created. This means that an image may be available for restoration much sooner than for conventional systems where there was a requirement to wait for a synchronization to complete. Because of the compact nature of the representation of an MLU, a clone may not consume the amount of space that is logically represented. Only space that is actively used may be consumed by a clone. Accordingly, clones using MLUs may be more compact than clones of conventional systems.

Conventional systems have typically been limited to a small number of clones for use as restore points because each restore point was an entire copy of the data to be archived. Because of the reduced storage requirements made possible by the use of MLUs for clone operations, a larger number of restore points, perhaps thousands, may be preserved for a given MLU. This increased number of restore points may provide a much richer history for the logical unit, any version of which may be made available for backup or recovery purposes. In contrast to conventional snapshot methodology, MLU restore points will be termed "replicas" for purposes of the description herein.

In order to support the increased number of restore points, the representation of these replicas may be organized to share common blocks with each other and with the MLU they were derived from. Accordingly, in addition to an increase in the number of replicas per MLU that may be preserved, the additional space used to store these replicas may also be minimized. In contrast to conventional clone methodologies that require copying of all data associated with a LUN to archive a copy of the LUN, the replicas, as described herein, may record (track) the differences between the current state of the replica and the state of the MLU the replica was derived from. By tracking the differences, unchanged data may be shared between the two MLUs upon creation of the replica, and the replica may be copied transparently and in the background to an archive.

A replica of an existing MLU may be thought of as a new reference to the same mapping structure. As changes are made to either the replica or the MLU, the mappings begin to diverge from each other and will share less and less of the original shared address space. An advantage of sharing the mapping between logical units is that in order to move a copy of one MLU to another location, only the data that is not already on the other needs to be moved.

Exploiting the sparseness property of MLUs may allow for reduced initial silvering costs for replication features. When silvering an MLU onto different storage on the same or another array, only blocks that were actually written will need to be moved because any unwritten blocks within the MLU do not need to be allocated, and thereby, a copy of the unallocated portions of the MLU is unnecessary. If the target array of the replication also has an MLU that shares some of the mapping with the new one being replicated, only different blocks will need to be moved to sufficiently represent the new MLU. Only differences between the two MLUs will be required to be copied.

An archive, as described herein, will be termed a "replica vault." A replica vault may be viewed as an array device that acts as a repository for the long term storage of restore points for logical units on other arrays. Replica vaults may store and retrieve many earlier versions of restore points, thereby preserving potentially thousands of restore points for a given source MLU. The data transfer between the array and the replica vault may be efficient compared with conventional systems because certain amounts of data may already reside on the vault and only changes (e.g., a minimum amount of data) may need to be moved to recreate the object on the other entity.

A vault may be browsed for the restore points for a particular MLU, as well as the set of all MLUs. Data may be accessed via an array attached to the vault, which may mount the data from the vault and may access the data before the data has been moved back to the accessing array (e.g., the movement process may be pended, or may complete in the background). In this fashion, an administrator may mount an older copy of some data, put it into use through the array and then dismiss the copy he was using without needing to move the data back to array he is using it from. The only local resources consumed in this process may be blocks in a pool to hold the changes to the remote copy, which may be freed when that local copy is dismissed.

Each MLU may have thousands of restore points available, depending upon the amount of storage in the replica vault, thereby representing a long history of activity for that MLU. Data on the vault may not be changed directly by an application, so there is a potential for the data on the vault to be used for regulatory compliance. Data on a vault may be mounted and accessed from another array before it may be modified. Further, replicas may be removed according to an automated policy, so the administrator may not have to actively administer this process. Because the vault itself has no direct host access, the vault need not be another array, but may be any kind of bulk storage device with a compatible API.

In an alternative embodiment, a vault may be a subpart of a local data storage array or may be implemented on a system at a location remote from the data storage extent array being archived. The operation of the local or remote vault may use the same semantics and may only differ in the resources available to store copies of the replicas. A local vault may have a faster access, but may potentially more limited storage capabilities. In contrast, a remote vault may reserve more of its space to hold data, but may be subject to any inter-array communication link latencies. The communication link used for communication between a remote replica vault and a data storage extent array may be a Storage Area Network (SAN) link, an Internet Protocol (IP) link, or any other suitable communication link. By allowing an MLU to mount a replica in the vault without requiring all data to be copied to the local array, the benefits of both the local array and the remote vault may be exploited to minimize the effects of local storage limitations and communication link latency.

As described above, the flexibility of the mapping used for an MLU may allow more efficient creation and storage of replicas. As a result, an MLU and any replica may share all or any part of the mapping that the two logical units have in common. When a replica or MLU modifies a storage extent they have in common, the modifier may allocate a new storage extent to hold the data, and the non-modifying replica or MLU may keep the reference to the original storage extent. This remapping of the address space may help to avoid extra read and write overhead associated with conventional copy-on-first-write systems. Subsequent writes to the new storage extent may use the new extent without any further remapping of the address space.

Because storage extents may be shared between MLUs, storage extents containing the same data may be shared between unrelated MLUs or in the same mapping of an MLU if the storage extent has the same contents. Sharing of common data between unrelated MLUs may provide another level of compression within the address space of a vault. This address space compression may either happen as the data is stored to the vault or after the store using some asynchronous procedure. Compression and/or data de-duplication techniques on the original array itself may also be possible, but may result in local CPU occupation better placed off line with a remote system.

Access to the vault may begin upon creation of a link to a stored replica. Once an array has been designated to retrieve a given replica from the vault, access to that data may begin immediately, subject to any delays in the communication link. A local MLU may be created that references the remote replica for the definition of its address space. If the data has not yet moved from the vault to the array, any read request may be redirected to the vault and sent back on demand. Data written to the replica on the array may be stored locally with a reference to any un-copied data to be moved as a background operation.

If the vault is a local object on the same array, then access speed for any items in the vault may be improved. In such a case, bringing a replica back into production may take place without any data movement, and may, consequently, have a reduced delay relative to a full restoration from a remote vault. An item may be left in the vault area on the local array and changes may be written to the active part of the array.

Given the compact nature of replica storage coupled with the potential for archival of many restore points, a vault may be built with write-once-read-many (WORM) technology. Mappings used for new replicas may continue to extend onto new media as necessary. The use of WORM technology may provide a platform upon which data may be archived and upon which it may not be changed, thereby increasing the stability of the replication process for archival purposes.

As described above, the sharing of common blocks between MLUs coupled with the fact that unused space within an MLU is not allocated allows for a more efficiently representation of replicas for replication purposes. The sharing of common blocks further provides that differences between any MLU and replica may be more efficiently represented. As a result, the representation of a replica may be more efficient and compact than snapshots on conventional systems, and replicas may occupy less storage space for a given restore point for archival purposes. Much of the extra data movement overhead associated with the creation of a restore point in conventional archival systems may be eliminated by the compact nature of the data representations described herein.

Because many replicas may be created using shared storage space and efficient lists of changes may be generated to replicate them to alternative storage, remote vaults of replicas for any MLU may be more efficiently generated than for snapshots in conventional systems. A vault may potentially contain many thousands of restore points per MLU—a significant improvement of conventional system limitations. The vault may allow remote access to the data without using local array storage resources so that a copy of a restore point may be identified. Because the representation of the MLU address space may be virtualized, remote disk storage extents may be used as members of an MLU without departure from the scope of the subject matter described herein. Data may be drawn back from a vault while in active use if the administrator decides to draw a certain restore point back for a given MLU. The vault may represent a larger stretch of history for an MLU. Active arrays may maintain recent copies of the MLU for a more rapid restore time, while older restore points may be archived to the vault for long term storage for later restoration or regulatory purposes.

The vault may remain a closed resource, without direct server access for security purposes (e.g., the arrays may be limited as the only entities that may restore and extract data from a vault). Arrays may "mount" different restore points from the vault and allow for server access to this data directly without moving all the data back onto the array that exports it. Copies may be made back from the vault when the array administrator needs to promote an older restore point to active use. The migration between the array and the vault may be implemented as a background operation, thereby further improving the efficiency of replication, storage, and retrieval for MLUs. Data movement may be reduced because only data that is not referenced and stored with a given entity may need to be moved when there is a request to store or retrieve a replica.

"Rollback" is another concept used herein to describe restoration of a restore point, which may be thought of as a substitution of one MLU address space for another. Because the address space of the MLU has been virtualized, a substitution of one mapping for the other may be used to reduce any data copy for a rollback. The overhead of a rollback may be greatly reduced and performance degradation may also be reduced when rolling back a large number of the logical units, such as when a large database has to be rolled back (that populates many different MLUs). Rollback may still involve a data copy if the data is not resident at the most efficient location for the array. However, as described above, this copy may be performed as a background operation and access to data may be relatively instantaneous. An example implementation for a rollback may be a rollback from a vault location.

Figure 3:
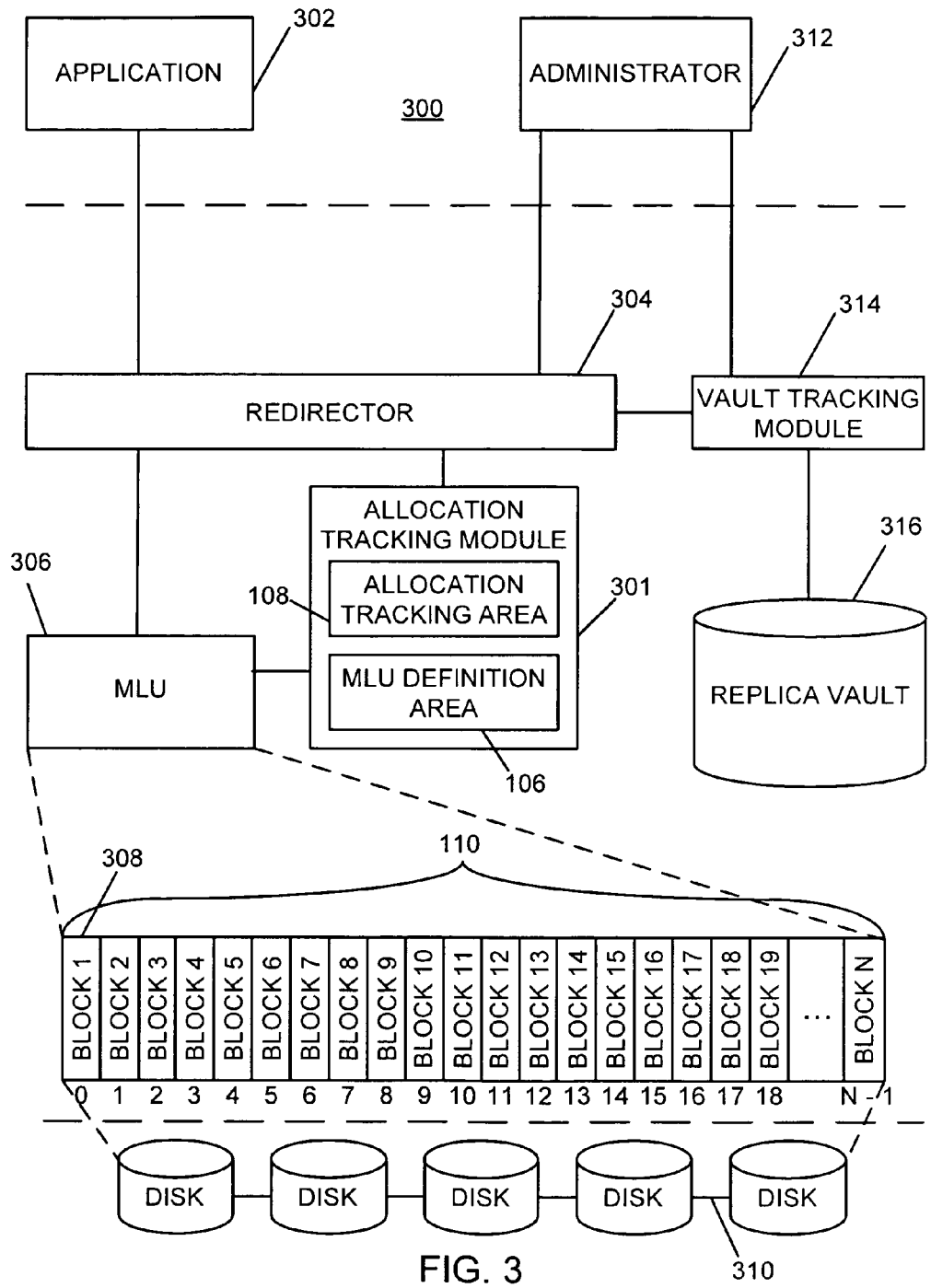
FIG. 3 is a block diagram of an exemplary dynamic allocation system for dynamically allocating storage extents from a data storage extent pool and for MLU replication, storage, and retrieval according to an embodiment of the subject matter described herein.

FIG. 3 illustrates an exemplary dynamic allocation system 300 for dynamically allocating storage extents from a data storage extent pool and for MLU replication, storage, and retrieval. An allocation tracking module 301 tracks system-level information related to allocation of storage extents, as will be described in more detail below, for an application 302. Application 302 may be any suitable application that reads data from and writes data to physical storage. In one exemplary implementation, application 302 may be a file server.

Application 302 may interface through a redirector 304 to an MLU 306 to virtually map its storage address space onto physical storage, as will be described in more detail below. MLU definition information may be stored within MLU definition area 106 and higher-level storage extent allocation and tracking information may be stored within allocation tracking area 108. As described above and in more detail below, the contents of allocation tracking area 108 may vary depending upon the size and granularity of dynamic allocation system 300. MLU creation, storage extent allocation and de-allocation, and MLU deletion may be tracked by allocation tracking module 301. Storage extent allocation and de-allocation may be communicated to allocation tracking module 301 by MLU 306 to allow allocation tracking module 301 to perform higher-level operations related to storage extent allocation.

As described above, MLU 306 interfaces via redirector 304 to application 302 and data storage pool 110 and provides a virtual address map of storage space for application 302. As will be described in more detail below, when application 302 performs a read operation from a portion of its virtual address range prior to allocation of a storage extent for the respective portion of the address space, MLU 306 may return zeros to application 302. When application 302 performs a write operation to a portion of its virtual address range, MLU 306 may allocate storage extents from data storage pool 110 on demand to occupy the respective portions of the virtual address space represented within MLU 306 and targeted by the write operation. MLU 306 may allocate storage extents (blocks) 308 from data storage pool 110 when needed by application 302 for data storage. The functionality of redirector 304 will be described in more detail below.

Data storage pool 110 represents a logically contiguous view of a portion of a physical RAID array 310, and as such, provides a mapping of storage extents 308 onto RAID array 310. For simplification, data storage pool 110 is illustrated as a logical layer that resides adjacent to RAID array 310, which may include physical disks. However, it is understood that one or more logical layers, such as aggregations of pools 110 and RAID groups, may reside between data storage pool 110 and the physical disks that make up RAID array 310 without departing from the scope of the subject matter described herein. As described above, RAID array 310 may also store allocation tracking area 108 and MLU definition area 106, and each storage extent 308 may represent a logically contiguous portion of RAID array 310 of a chosen granularity. Redirector 304, MLU 306, and allocation tracking module 301 comprise kernel-space software/firmware including both behavioral and data management aspects. An exemplary hardware platform on which dynamic allocation system 300 may be implemented is the CLARiiON® platform available from EMC Corporation of Hopkinton, Mass.

An administrator module 312 may be used to manage dynamic allocation system 300 for data archival and restoration purposes. Administrator module 312 may communicate with redirector module 304 to configure backup and retrieval operations associated with MLU 306 and may communicate over a separate interface with a vault tracking module 314 to view the contents of a replica vault 316. Vault tracking module 314 may separately communicate with redirector module 304 for data archival and retrieval purposes. For example, when MLU 306 mounts a replica stored in replica vault 316, it may do so via redirector 304, which may redirect any accesses directed toward MLU 306 from application 302 to the replica stored in replica vault 316 via vault tracking module 314. The details of these communication interfaces and actions will be described in more detail below. However, it should be noted that application 302 may not have primary access to replica vault 316 and that redirector module 304 may manage any data transactions with replica vault 316 for both application 302 and MLU 306.

As described above, replica vault 316 may be used for longer-term storage of data generated by application 302 and represented within MLU 306. Replica vault 316 may store its data in a single RAID array or may distribute its data across multiple RAID arrays. Further, replica vault 316 may be co-located with pool 110 within RAID group 310 or may be remotely located in a different fault domain. A fault domain may be defined as a domain subject to a common power supply. Accordingly, by placing a replica vault in a different fault domain, redundant data archiving may be improved.

When a replica of MLU 306 is created, for example when archiving a point-in-time copy, it may be stored within replica vault 316 and may be retrieved when desired as a restoration point for the MLU 306, or may be used to track changes in the data referenced by application 302. As will be described in more detail below, the representation of data within both RAID array 310 and replica vault 316 offers a more compact and more efficient form of data storage than in conventional systems.

Redirector module 304 may be used by administrator module 312 to configure backup and retrieval operations related to MLU 306. Redirector module 304 may also be used to redirect data accesses associated with MLU 306 under certain circumstances. For example, when a replica of MLU 306 is in the process of being retrieved from replica vault 316, but has not been fully restored, redirector module 304 may redirect any MLU 306 accesses for locations that are still resident in replica vault 316 to the appropriate location within replica vault 316 rather than MLU 306. As well, when MLU 306 mounts a replica stored within replica vault 316, redirector 304 may re-route any application 302 accesses of MLU 306 to the appropriate location within replica vault 316. In this way, MLU 306 may mount a replica in replica vault 316 without requiring the associated data to be copied back to data storage pool 110. The details of the redirection mechanisms and the interaction of redirector module 304 with administrator module 312 and vault tracking module 314 will be described in more detail below.

Redirector module 304 further provides an interface between administrator module 312 and both of allocation tracking module 301 and MLU 306. This interface may be used to configure or view the contents of both allocation tracking module 301 and MLU 306. For example, administrator module 312 may utilize the contents of allocation tracking area 108 for statistical purposes to determine whether additional physical storage may need to be added to or removed from data storage pool 110. As well, administrator module 312 may utilize the interface with MLU 306 to instruct MLU 306 to mount a replica stored in replica vault 316, and may indicate whether MLU 306 should temporarily mount the stored replica or whether the replica should be copied to data pool 110 for a full restoration of the point-in-time copy.

Regarding the archival and viewing of replicas within replica vault 316, "family trees" may be constructed to log changes to and differences between an original MLU and replicas thereof. Family trees may be used to associate the differences between an original MLU and any replica derived from it. When a replica of an MLU is made and copied to replica vault 316, the storage extents within the source MLU may be copied to contiguous locations within replica vault 316 or may be copied to noncontiguous locations depending upon the fragmentation of replica vault 316. Defragmentation of replica vault 316 may be performed as a background task, and storage pointer structures of a replica may be modified to point to any relocated storage extents. When a replica is to be copied to replica vault 316 to form a complete restore point (e.g., including all associated storage extents), the data within potentially noncontiguous source storage extents may be copied to contiguous destination storage extents for any contiguous ranges of storage extents that are available within replica vault 316, thereby reorganizing the data relationships for the replica relative to the original MLU. Any remapping of storage extents may be managed within vault tracking module 314 using family trees. Family trees may also be viewable by administrator module 312 and accessible by MLU 306 via redirector module 304.

To better understand the replication, storage, and retrieval of MLUs, dynamic storage extent allocation and tracking will now be described. Details related to replication, storage, and retrieval of MLUs will be described following a description of the dynamic allocation and tracking of storage extents.

Figure 4:
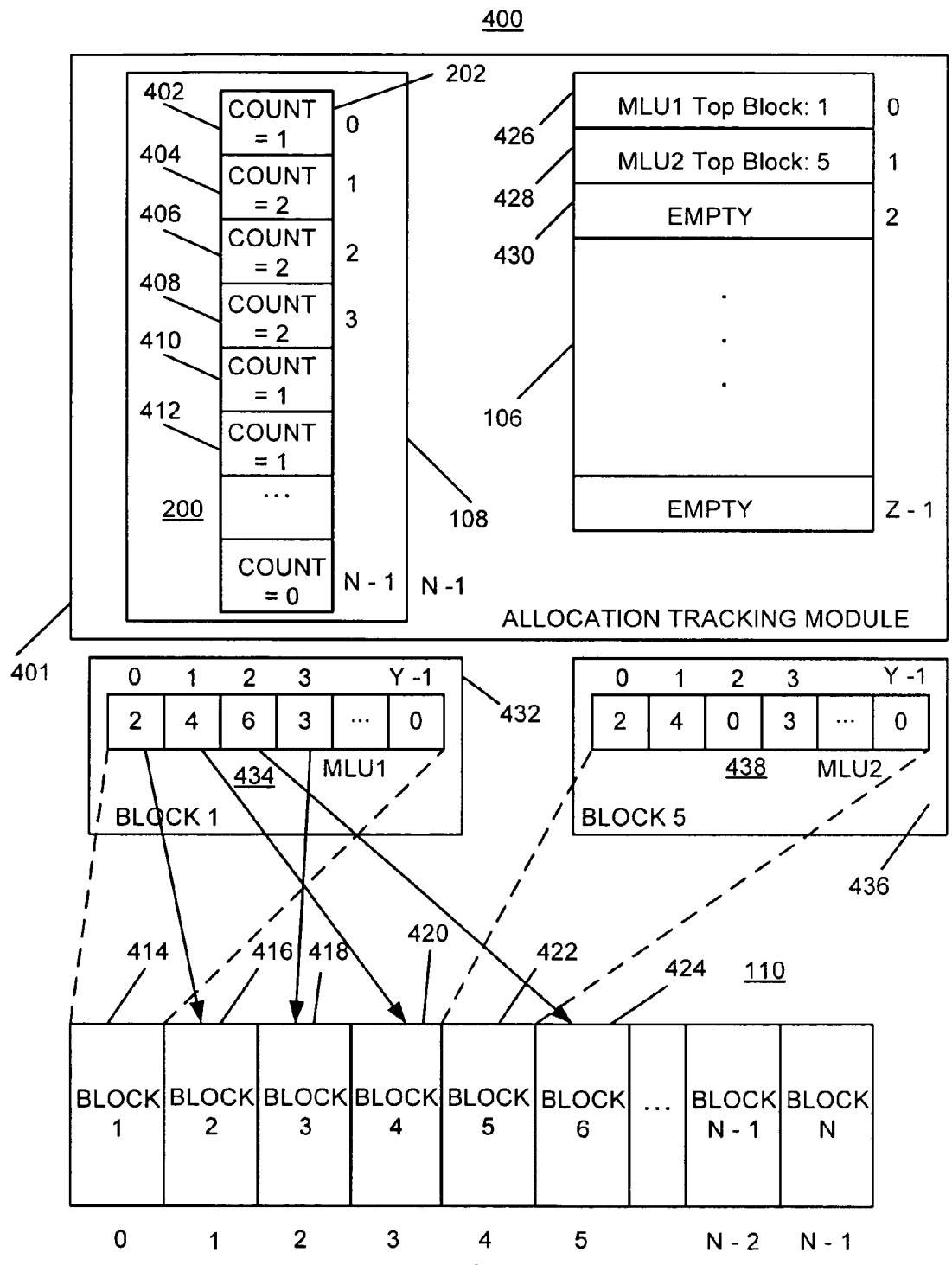
FIG. 4 is a block diagram of an exemplary dynamic allocation system of moderate size and granularity for dynamically allocating storage extents from a storage extent pool and for MLU replication, storage, and retrieval according to an embodiment of the subject matter described herein.

FIG. 4 illustrates an exemplary dynamic allocation system 400 of moderate size and granularity for dynamically allocating storage extents from a storage extent pool and for MLU replication, storage, and retrieval. Exemplary dynamic allocation system 400 is based upon exemplary dynamic allocation system 300 for the case of moderate size and granularity. FIG. 4 focuses on portions of system 400 that are used for initial storage extent allocation. Other portions of system 400 that are related to MLU replication, storage, and retrieval are not depicted in FIG. 4 and will be described with respect to other embodiments below. FIG. 4 depicts dynamic allocation system 400 after three initial write operations to an MLU have been performed, one point-in-time copy of the MLU has been made, and data has been subsequently written to a portion of the address range shared by the two MLUs.

Allocation tracking module 401 is based upon allocation tracking module 301 with data structures, as described above and in more detail below, for a system of moderate size and granularity. Allocation tracking module 401 references allocation tracking area 108, including an allocation tracking structure 200 partitioned into N segments that are indexed from zero (0) to N minus one (N−1). As can be seen from FIG. 4, a column of allocation count fields 202 indicates that certain storage extents in data storage pool 110 are allocated, as indicated by a count greater than zero in each allocation count field 202 associated with an allocated storage extent. The rows of allocation tracking structure 200 represent individual entries in the tracking structure. Rows 402, 404, 406, 408, 410, and 412 represent tracking structure entries associated with allocated storage extents, each of which includes an allocation count field 202 with a count value greater than zero, as will be described in more detail below.

Data storage pool 110 is represented with N storage extents of equal size, where N corresponds to the number of allocation count fields 202 described above. For illustrative purposes, each storage extent will be considered to be 64K bytes in size (65,536 bytes of storage space). Storage extents 414, 416, 418, 420, 422, and 424 represent storage extents for blocks 1 through 6, respectively.

In FIG. 4, MLU definition area 106 includes Z segments of MLU definition identifiers that may be used to identify MLUs when they are created. These identifiers may include attributes for identifying blocks (block pointers) within data storage pool 110. Dynamic allocation system 400 shows that two MLUs have been defined. MLU definition entries 426, 428 and 430 represent the MLU definition entries at indexes zero (0), one (1) and two (2) respectively.

MLU1 432 is shown registered in MLU definition entry 426. MLU definition entry 426 points to block 1 414 of data storage pool 110. Row 402 of allocation tracking area 108 contains a count value of one ("1") indicating that storage extent 414 is referenced by only one MLU, MLU1 432. MLU1 432 includes a storage pointer structure 434 stored in block 1 414 and representing the storage address range for MLU1 432. The entries within storage pointer structure 434 represent Y storage pointers that may be used to point to storage extents, indexed from zero (0) to Y minus one (Y−1).

In the illustrated example, the entries within storage pointer structure 434 that include non-zero values point to storage extents allocated by MLU 432. As described above, these storage extents may be allocated when an application performs a write operation. The maximum address range of the MLU may be represented by the number of pointers, Y, provided within the storage pointer structure 434 multiplied by the storage extent size that may be referenced by each pointer.

Each pointer within storage pointer structure 434 may point to other storage extents that may each include another storage pointer structure. This may continue until enough storage pointers are referenced to fully occupy the desired address range for an application. Accordingly, a multi-layered storage pointer array system is possible, thereby allowing scalability of MLU address ranges, either at MLU creation or over time.

In order to determine whether a multi-layered storage pointer array should be used, the desired address space for the application should be divided by the size of the storage extents or ALUs to be allocated from within the pool to yield the number of storage extent pointers to be used. The number of storage extents that should be allocated for storage of the storage extent pointers can be determined by dividing the number of storage pointers by the number of storage pointers that may be stored in one storage extent to yield the number of storage extents to be used to store the pointers. The number of storage extent pointers that may be stored within a storage extent is a function of the storage extent size divided by the pointer size. When the number of storage pointers exceeds the capacity of one storage extent to hold them all, an additional number of storage extents may be used to create a multi-layered storage pointer array. For simplicity of description, only one layer is represented in FIG. 4.

As described above, FIG. 4 illustrates dynamic allocation system 400 after three initial write operations to an MLU have been performed, one point-in-time copy of the MLU has been made, and data has been subsequently written to a portion of the address range shared by the two MLUs. With respect to the three initial write operations (e.g., prior to a point-in-time copy), storage blocks may be allocated to the MLU when write requests are processed. For illustrative purposes and assuming byte addressability, the three initial write operations will be assumed to have sequentially been to the first, fourth, and second 64K address segments of the address range addressable by MLU1 432 (e.g., byte ranges 0-65,535; 196, 608-262,143; and 65,536-131,071, respectively). These address ranges are respectively represented by fields 0, 3, and 1 of storage pointer structure 434.

As can be seen from FIG. 4, storage extent 416 (block 2), 418 (block 3), and 420 (block 4) of data pool 110 have been allocated for storage of the written data. The first, fourth, and second storage pointers of storage pointer structure 434 have been updated based upon these three initial write operations to point to storage extent 416 (block 2), 418 (block 3), and 420 (block 4) respectively, and to reflect the write operation to those contiguous storage ranges of the MLU definition. However, the data was placed at logically non-contiguous address ranges in the data pool. The unwritten address ranges in the address range of the MLU have not been propagated to the storage medium. The unwritten address ranges have been effectively removed from the storage requirement. Read operations from the addresses that have been written will return data from the data pool locations referenced by the pointers, while read operations from non-written areas will return zero values without requiring storage allocation for this logical consistency.

As can be seen from FIG. 4, write requests may be accepted for any region of an MLU address range in any order and storage may be allocated in a real time fashion on the fly. This storage allocation may be both cyclical with respect to the storage array and synchronous with respect to write cycles, thereby creating a cyclical-synchronous allocation of the storage pool. For example, for data write operations, an MLU may cycle through the data storage extent pool and allocate data storage extents required by the write operation. As storage blocks are deleted from MLU definitions, they may be returned to the pool for re-allocation on the next allocation cycle through the pool.

Again, it should be noted that the block pointers at the first level of an MLU definition may point to other levels of block pointers rather then pointing directly to storage blocks. In this way, the address range of MLUs may be expanded either at the time of creation or may be dynamically grown or reduced as needed. In order to keep the logical address space of the MLU contiguous, for a single growth level (e.g., adding just one more block of pointers to an MLU definition), a new storage pointer array may be allocated and the original storage pointer structure may be referenced by the zeroth element of the new storage pointer structure. In this way, the address space of the MLU may be expanded at the end of the address range represented by the original storage pointer structure. Alternatively, the last block in the storage pointer array may be allocated as a pointer to another storage pointer array. This technique may be continued to create a multi-layered storage pointer structure. This may continue until the desired addressability is achieved, within the scope of allocable storage space within the data pool. As described above, the address space may be fixed for MLUs and a multi-level set of arrays of pointers may be used to reference the desired logical address range. Again, the number of pointers used may be based upon the storage extent size multiplied by the number of storage pointers needed to reference the address range.

Another benefit of this architecture is the compact storage relationship that may be used for making point-in-time copies of a storage range referenced by an MLU. A point-in-time copy may be made by simply copying the MLU definition (e.g., the top level pointer).

As described above, FIG. 4 further illustrates dynamic allocation system 400 after three initial write operations to an MLU have been performed, one point-in-time copy of the MLU has been made, and data has been subsequently written to a portion of the address range shared by the two MLUs. With respect to the point-in-time copy of the MLU, FIG. 4 shows that a second MLU, MLU2 436, has been created and that it references all previously allocated storage extents referenced by MLU1 432. MLU definition entry 428 shows that MLU2 436 has been created. Initially, MLU2 436 may have been created as a copy of MLU1 432 without allocation of a storage extent other than those previously allocated by MLU1 432 by pointing to the top-level block storage pointer structure 434 (pointing to block 1) of MLU1 432 within MLU definition entry 428 (not shown in FIG. 4). In the case of an initial copy, MLU definition entry 428 would show a pointer to the same top block (block 1) as that pointed to by MLU 1, 432. However, as described above, FIG. 4 illustrates dynamic allocation system 400 after data has been subsequently written to a portion of the address range shared by the two MLUs. Accordingly, MLU definition entry 428 shows a pointer to a different top block (block 5), as will be described below.

The initial point-in-time copy is compact and allows for multiple point-in-time copies to be generated in a small storage space. It should be noted that no other data storage has been copied to create this point-in-time copy. Accordingly, for a given amount of storage space, more copies may be made more often, thereby providing an increased granularity in the point-in-time backup mechanism. By reusing the physical storage blocks for the point-in-time copy, storage allocation has been improved for facilities such as data backup and recovery points, and related tasks. The ability to copy an MLU by copying the top block, (e.g., making point-in-time copies with little overhead in this fashion) shall be termed herein as virtualization. Virtualization allows for a reduced storage requirement for MLU copies.

As described above, FIG. 4 further illustrates dynamic allocation system 400 after three initial write operations to an MLU have been performed, one point-in-time copy of the MLU has been made, and data has been subsequently written to a portion of the address range shared by the two MLUs. With respect to the data that has been subsequently written to a portion of the address range shared by the two MLUs, FIG. 4 illustrates a data write to the address space of the original MLU, MLU1 432, which is now a shared address space with MLU2 436. The address range for this write operation is assumed to be the third block in the address range of MLU1 432 (e.g., byte ranges 131,071-196,607). Because MLU2 436 is a point-in-time backup, no write operations have been performed to the physical address space referenced by MLU2 436 in order to preserve the point-in-time copy. The write to the shared address space of MLU1 432 and MLU2 436 may be accomplished by allocation of two data blocks, 422 and 424.

Data block 422 may be allocated and used to store the original storage pointer structure 434 of MLU1 432. Initially, no storage extent was allocated for the point-in-time copy, and MLU definition entry 428 pointed to a top block (block 1) associated with MLU1 432. However, when a data write operation occurs to the shared address space, the original pointer storage structure may be copied to preserve the current state of the point-in-time copy, and the pointer reference may be transferred to the new MLU, MLU2 436. Accordingly, the point-in-time storage pointer structure 438 for MLU2 436 has been created and has been stored in storage extent 422 (block 5). As well, FIG. 4 illustrates an update of MLU definition entry 428 to show this allocation by reference to the new top block (block 5) of MLU2 436.

Data block 424 may be allocated and used to store the new data written to the address space of MLU1 432. MLU1 432 may change over time while preserving the data state of that point-in-time copy by allocating new blocks as new data is written to its address space. MLU1 432 has become a derived MLU, derived from the original set of storage blocks with additional blocks allocated to store the changes and is now a child of MLU2 436. MLU2 436 has become the parent of MLU1 432 and holds a reference point from which changes to its child, MLU1 432, have been and will be performed. Storage pointer structure 434 of MLU1 432 now points to all of the original data pool blocks and has a new entry for block 6 (e.g., storage extent 424) for the address range represented by the write operation.

The allocation count fields 202 of rows 402 through 412 illustrate the reference counts for the respective storage extents. Because only one MLU, MLU1 432, references storage extent 414, row 402 holds a count value of one ("1"). Rows 404 through 408 illustrate that both MLU1 432 and MLU2 436 reference the respective storage extents with a count value of two ("2") in each allocation count field 202. Row 410 holds a count value of one ("1") to indicate that only one MLU, MLU2 436, references block 5 which now stores the original contents of storage pointer structure 434, now referenced as storage pointer structure 438. Row 412 holds a count value of one ("1") to indicate that only one MLU, MLU1 432, references block 6, which holds the data written to MLU1 432 after the point in time copy.

As may be seen from the above description, multiple point-in-time copies may be made with very little overhead and may be preserved without extensive new memory allocations. The point-in-time copy may become the owner of shared blocks upon a new write operation that changes the original MLU definition, thereby, obviating a need to allocate entirely new sets of storage blocks for storage of point-in-time copies. Other blocks may remain shared blocks until new writes to the shared blocks occur, and new allocations may be made at the time storage is needed rather than at the time of the point-in-time copy. By referencing the shared blocks with a multiple allocation count, a write to the address space of a child, for example MLU1 432, allows MLU1 432 to recognize that it should allocate a new block when a write operation occurs to any of its address space. In this way, dynamic storage allocation may continue for many more point-in-time copies and with similarly compact representations.

Similar transformations of storage space may be performed when data has been deleted from an MLU address range. Upon return of a data block to the pool, the associated allocation tracking fields may be returned to a default state and the block made available for new allocation on the next round of block allocations from the pool. As described above, a cyclical-synchronous allocation may be performed on the pool. As well, any other allocation mechanism for allocating noncontiguous blocks of storage from a storage pool may be performed and all are considered within the scope of this disclosure.

Entire replicas of MLUs are also possible, as will be described below, by allocation of sufficient new storage blocks to store all physical data associated with an MLU, including its pointer structures, and by changing the contents of the copied pointer structures to point to the respective copies of the storage extents. In this way, replicas may be made without any shared blocks. Replicas may be used for either local or remote archival of MLUs, including the associated data pointers, and for more enhanced recovery mechanisms. Replicas may also be used to create complete system state backup copies of MLU pool data. When a replica is made to an entirely different address space, the replica may be thought of as a facsimile, whether in the same or a different pool. When a facsimile is made to a different fault domain, it may be thought of as a complete clone of the original MLU.

The system described in FIG. 4 represents a system capable of performing the functionality as described herein for a system of moderate size and granularity. Multiple layers of pointers may be used to expand the address space of an MLU. Accordingly, any and all pointer mechanisms capable of identifying storage locations in a storage pool are considered within the scope of the subject matter described herein.

Figure 5:
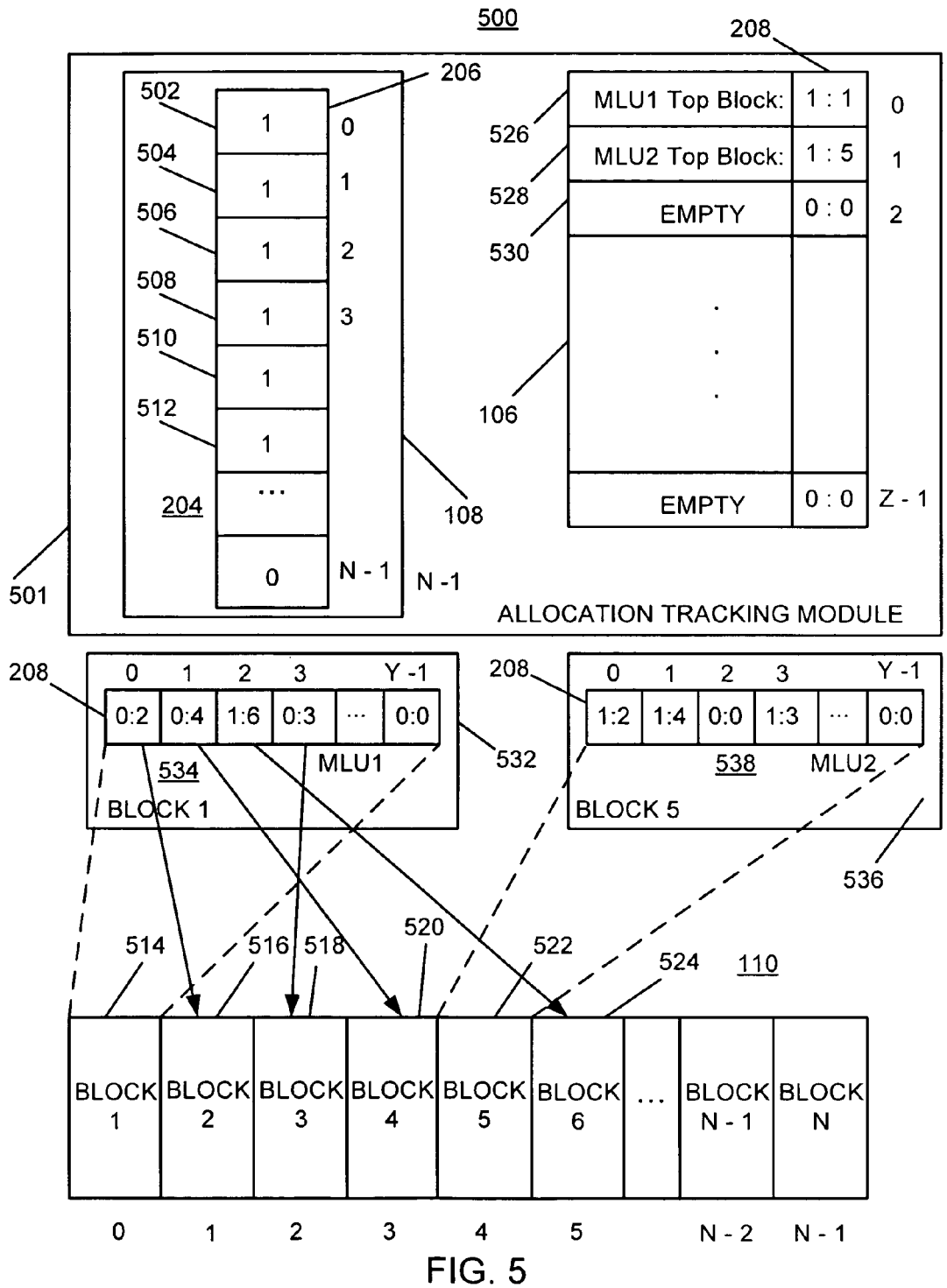
FIG. 5 is a block diagram of an exemplary dynamic allocation system representing a large, highly granular system for dynamically allocating storage extents from a storage extent pool and for MLU replication, storage, and retrieval according to an embodiment of the subject matter described herein.

FIG. 5 illustrates an exemplary dynamic allocation system 500 representing a large, highly granular system for dynamically allocating storage extents from a storage extent pool and for MLU replication, storage, and retrieval. Exemplary dynamic allocation system 500 is based upon exemplary dynamic allocation system 300 for the case of a large, highly granular system. FIG. 5 focuses on portions of system 500 that are used for initial storage extent allocation. Other portions of system 500 that are related to MLU replication, storage, and retrieval are not depicted in FIG. 5 and will be described in other embodiments below. FIG. 5 depicts dynamic allocation system 500 after three initial write operations to an MLU have been performed, one point-in-time copy of the MLU has been made, and data has been subsequently written to a portion of the address range shared by the two MLUs.

Allocation tracking module 501 is based upon allocation tracking module 301 with data structures, as described above and in more detail below, for a large, highly granular system. Allocation tracking module 501 references allocation tracking area 108, including an allocation tracking bitmap 204, partitioned into N segments that are indexed as zero (0) to N minus one (N−1). As can be seen from FIG. 5, a column of allocation bit fields 206 indicate that certain storage extents in data storage pool 110 are allocated, as indicated by a set indicators in each allocation bit field 206 associated with an allocated storage extent. The rows of allocation tracking bitmap 204 represent individual entries in the tracking structure. Rows 502, 504, 506, 508, 510, and 512 represent tracking structure entries, each of which includes an allocation bit field 206 with its indicator set, as will be described in more detail below.

Data storage pool 110 is represented with N storage extents of equal size, where N is a number that corresponds to the number of allocation tracking bits in allocation tracking bitmap 204. For illustrative purposes, each storage extent will be considered to be 64K bytes in size (65,536 bytes of storage space). Storage extents 514, 516, 518, 520, 522, and 524 represent storage extents for blocks 1 through 6, respectively.

In FIG. 5, MLU definition area 106 includes Z segments of MLU definition identifiers that may be used to identify MLUs when they are created. These identifiers may include attributes for identifying blocks (block pointers) within data storage pool 110. Dynamic allocation system 500 shows that two MLUs have been defined. MLU definition entries 526, 528 and 530 represent the MLU definition entries at indexes zero (0), one (1) and two (2) respectively, each including a dynamic allocation tracking storage extent numbering structure 208. For ease of presentation, as described above, dynamic allocation tracking storage extent numbering structures 208 are shown with owner bit field 212 and storage extent number field 210 as colon-separated pairs. Owner bit field 212 and storage extent number field 210 are colon-separated fields, as described above, so that the owner bit field 212 is the highest order number and the storage extent number field 210 is the lowest order number (e.g., 0:0 for the case of no owner of storage extent zero).

MLU1 532 is shown registered in MLU definition entry 526. MLU definition entry 526 points to block one (1) 514 of data storage pool 110, as represented by the designators, as described above, in the associated dynamic allocation tracking storage extent numbering structure 208 (e.g., 1:1) to show that MLU1 532 is the owner of block one (1). Allocation tracking bitmap 204 row 502 has been modified to reflect that the respective storage extent (block 1 514 at index zero of data storage pool 110) is used by an indication of one (1) in allocation bit field 206.

MLU1 532 includes a storage pointer structure 534 stored in block 1 514 and representing the storage address range for MLU1 532. The entries within storage pointer structure 534 represent Y storage pointers that may be used to point to storage extents, indexed from zero (0) to Y minus one (Y−1). The storage pointers used in dynamic allocation system 500 differ from those used in dynamic storage system 400. In dynamic allocation system 500, allocation tracking storage extent numbering structures 208 are used instead of storage extent pointers of other embodiments. The allocation tracking storage extent numbering structures 208 each include owner bit field 212 and storage extent number field 210.

In the illustrated example, the entries within storage pointer structure 534 that include non-zero values point to storage extents allocated by MLU1 532. As described above, these storage extents may be allocated when an application performs a write operation. The maximum address range of the MLU may be represented by the number of pointers, Y, provided within the storage pointer structure 534 multiplied by the storage extent size that may be referenced by each pointer.

Each pointer within storage pointer structure 534 may, instead of including allocation tracking storage extent numbering structures 208, point to other storage extents that may each include other storage extent pointers. This may continue until enough storage pointers may be referenced to fully occupy the desired address range for an application. Accordingly, a multi-layered storage pointer array system is possible, thereby allowing scalability of MLU address ranges, either at MLU creation or over time.

In order to determine whether a multi-layered storage pointer array should be used, the desired address space for the application should be divided by the size of the storage extents or ALUs to be allocated from within the pool to yield the number of storage extent pointers to be used. The number of storage extents that should be allocated for storage of the storage extent pointers may be determined by dividing the number of storage pointers by the number of storage pointers that may be stored in one storage extent to yield the number of storage extents to be used to store the pointers. The number of storage extent pointers that may be stored within a storage extent is a function of the storage extent size divided by the pointer size. When the number of storage pointers exceeds the capacity of one storage extent to hold them all, an additional number of storage extents may be used to create a multi-layered storage pointer array. For simplicity of description, only one layer is represented in FIG. 5.

As described above, FIG. 5 illustrates dynamic allocation system 500 after three initial write operations to an MLU have been performed, one point-in-time copy of the MLU has been made, and data has been subsequently written to a portion of the address range shared by the two MLUs. With respect to the three initial write operations (e.g., prior to a point-in-time copy), storage blocks may be allocated to the MLU when write requests are processed. For illustrative purposes and assuming byte addressability, the three initial write operations will be assumed to have sequentially been to the first, fourth, and second 64K address segments of the address range addressable by MLU1 532 (e.g., byte ranges 0-65,535; 196, 608-262,143; and 65,536-131,071, respectively). These address segments are respectively represented by fields 0, 3, and 1 of allocation tracking storage extent numbering structure 208.

As can be seen from FIG. 5, storage extent 516 (block 2), 518 (block 3), and 520 (block 4) of data pool 110 have been allocated for storage of the written data. The first, fourth, and second storage pointers of storage pointer structure 534 have been updated based upon these three initial write operations to point to storage extent 516 (block 2), 518 (block 3), and 520 (block 4), respectively, and to reflect the write operation to those contiguous storage ranges of the MLU definition. However, the data was placed at logically non-contiguous address ranges in the data pool. The unwritten address ranges in the address range of the MLU have not been propagated to the storage medium. The unwritten address ranges have been effectively removed from the storage requirement. Read from the addresses that have been written will return data from the data pool locations referenced by the pointers, while reads from non-written areas will return zero values without requiring storage allocation for this logical consistency.

As can be seen from FIG. 5, write requests may be accepted for any region of an MLU address range in any order and storage may be allocated in a real time fashion on the fly. This storage allocation may be both cyclical with respect to the storage array and synchronous with respect to the write cycles, thereby creating a cyclical-synchronous allocation of the storage pool. For example, for data write operations, an MLU may cycle through the data storage extent pool and allocate data storage extents required by the write operation. As storage blocks are deleted from MLU definitions, they may be returned to the pool for re-allocation on the next allocation cycle through the pool.

Again, it should be noted that the block pointers at the first level of an MLU definition may point to other levels of block pointers rather then pointing directly to storage blocks. In this way, the address range of MLUs may be expanded either at the time of creation or may be dynamically grown or reduced as needed. In order to keep the logical address space of the MLU contiguous, for a single growth level (e.g., adding just one more block of pointers to an MLU definition), a new storage pointer array may be allocated and the original storage pointer structure may be referenced by the zeroth element of the new storage pointer structure. In this way, the address space of the MLU may be expanded at the end of the address range represented by the original storage pointer structure. Alternatively, the last block in the storage pointer array may be allocated as a pointer to another storage pointer array. This technique may be continued to create a multi-layered storage pointer structure. This may continue until the desired addressability is achieved, within the scope of allocable storage space within the data pool. As described above, the address space may be fixed for MLUs and a multi-level set of arrays of pointers may be used to reference the desired logical address range. Again, the number of pointers used may be based upon the storage extent size multiplied by the number of storage pointers needed to reference the address range.

Another benefit of this architecture is the compact storage relationship that may be used for making point-in-time copies of a storage range referenced by an MLU. A point-in-time copy may be made by simply copying the MLU definition (e.g., the top level pointer).

FIG. 5 also illustrates the updating of allocation tracking bitmap 204 and dynamic allocation tracking storage extent numbering structures 208 to reflect the allocation of the three blocks from data pool 110. As can be seen from FIG. 5, rows 504, 506, and 508 have been updated to a one (1) to indicate that the respective blocks have been allocated.

Upon initial allocation of the storage extents, the dynamic allocation tracking storage extent numbering structures 208 of storage pointer structure 534 at indexes zero (0), three (3), and one (1) may be updated to show that MLU1 532 is the owner of block 2 (at index zero), block 3 (at index three), and block 4 (at index one) by setting the owner bit fields 212 of each dynamic allocation tracking storage extent numbering structures 208 to a one (1) and the storage extent number fields 210 referenced by the pointers to blocks two (2), three (3), and four (4), respectively (e.g., 1:2, 1:3, and 1:4). However, recall that dynamic allocation system 500 is depicted after three initial write operations to an MLU have been performed, one point-in-time copy of the MLU has been made, and data has been subsequently written to a portion of the address range shared by the two MLUs. Accordingly, as can be seen from FIG. 5, dynamic allocation tracking storage extent numbering structures 208 of storage pointer structure 534 at indexes zero (0), three (3), and one (1) have been updated to show that MLU1 532 is no longer the owner of block 2 (at index zero), block 3 (at index three), and block 4 (at index one) by clearing the owner bit fields 212 of each dynamic allocation tracking storage extent numbering structures 208 to a zero (0) and the storage extent number fields 210 referenced by the pointers to blocks two (2), three (3), and four (4), respectively (e.g., 0:2, 0:3, and 0:4). The purpose for clearing the owner bit fields 212 will be described in more detail below.

As described above, FIG. 5 further illustrates dynamic allocation system 500 after three initial write operations to an MLU have been performed, one point-in-time copy of the MLU has been made, and data has been subsequently written to a portion of the address range shared by the two MLUs. With respect to the point-in-time copy of the MLU, FIG. 5 shows that a second MLU, MLU2 536, has been created and that it references all previously allocated storage extents referenced by MLU1 532. MLU definition entry 528 shows that MLU2 536 has been created.

Because FIG. 5 illustrates dynamic allocation system 500 after data has been subsequently written to a portion of the address range shared by the two MLUs, the values represented within MLU definition entry 528 are different than the values that would initially be within MLU definition entry 528 prior to the subsequent write to the shared address range. Initially, MLU2 536 may have been created as a copy of MLU1 532 without allocation of a storage extent other than those previously allocated by MLU1 532 by pointing to the top-level block storage pointer structure 534 (pointing to block 1) of MLU1 532 within MLU definition entry 528. In the case of an initial copy, MLU definition entry 528 may include a dynamic allocation tracking storage extent numbering structure 208 referencing block 1 in the storage extent number field 210 with the owner bit field 212 cleared to indicate that MLU2 536 is not the owner of block 1 (e.g., 0:1). However, as described above, FIG. 5 illustrates dynamic allocation system 500 after data has been subsequently written to a portion of the address range shared by the two MLUs. Accordingly, MLU definition entry 528 shows a pointer to a different top block (block 5) and indicates that MLU2 536 is the owner of the block (e.g., 1:5), as will be described below.

The initial point-in-time copy is compact and allows for multiple point-in-time copies to be generated in a small storage space, thereby allowing an increased granularity in the point-in-time backup mechanism. By reusing the physical storage blocks for the point-in-time copy, storage allocation has been improved for facilities, such as data backup and recovery points, and related tasks. The ability to copy an MLU by copying the top block, (e.g., making point-in-time copies with little overhead in this fashion) shall be termed herein as virtualization. Virtualization allows for a reduced storage requirement for MLU copies.

It should be noted that no other data storage has been copied to create this point-in-time copy. This point-in-time copy is compact and allows for multiple point-in-time copies to be generated in a small storage space, thereby allowing an increased granularity in the point-in-time backup mechanism. By reusing the physical storage blocks for the point-in-time copy, storage reuse has been improved for facilities such as data backup and recovery points, and related tasks. As described above, the ability to copy an MLU by copying the top block, (e.g., making point-in-time copies with little overhead in this fashion) shall be termed herein as virtualization. Virtualization allows for a reduced storage requirement for MLU copies.

As described above, FIG. 5 further illustrates dynamic allocation system 500 after three initial write operations to an MLU have been performed, one point-in-time copy of the MLU has been made, and data has been subsequently written to a portion of the address range shared by the two MLUs. With respect to the data that has been subsequently written to a portion of the address range shared by the two MLUs, FIG. 5 illustrates a data write to the address space of the original MLU, MLU1 532, which is now a shared address space with MLU2 536. The address range for this write operation is assumed to be the third block in the address range of MLU1

532 (e.g., byte ranges 131,071-196,607). Because MLU2 536 is a point-in-time backup, no write operations will be performed to the physical address space referenced by MLU2 536 in order to preserve the point-in-time copy. The write to the shared address space of MLU1 532 and MLU2 536 may be accomplished by allocation of two data blocks 522 and 524.

Data block 522 may be allocated and used to store the original storage pointer structure 534 of MLU1 532. Recall, that initially, no storage extent was allocated for the point-in-time copy and that MLU definition entry 528 pointed to a top block (block 1) associated with MLU1 532. However, when a data write operation occurs to the shared address space, the original pointer storage structure may be copied to preserve the current state of the point-in-time copy and the pointer reference may be transferred to the new MLU, MLU2 536. Accordingly, the point-in-time storage pointer structure 538 for MLU2 536 has been created and has been stored in storage extent 522 (block 5). As well, FIG. 5 illustrates an update of MLU definition entry 528 to show this allocation by reference to the new top block (block 5) of MLU2 536. Within MLU definition entry 528, owner bit field 212 has been set to a one (1) and storage extent number field 210 has been set to point to block five (5) (e.g., 1:5). This allocation of block five (5) may be used as a trigger for ownership change, as will be described below.

Data block 524 may be allocated and used to store new data written to the address space of MLU1 532. MLU1 532 may change over time while preserving the data state of that point-in-time copy by allocating new blocks as new data is written to its address space. MLU1 532 has become a derived MLU, derived from the original set of storage blocks with additional blocks allocated to store the changes and is now a child of MLU2 536. MLU2 536 has become the parent of MLU1 532 and holds a reference point from which changes to its child, MLU1 532, have been and will be performed. Storage pointer structure 534 of MLU1 532 now points to all of the original data pool blocks and has a new entry for block 6 (e.g., storage extent 524) for the address range represented by the write operation. MLU1 532 may be designated as the owner of this block by setting owner bit field 212 to a one (1) and setting storage extent number field 210 to point to block six (6) (e.g., 1:6) at index two (2) within block structure pointer 534. Storage pointer structure 534 of MLU1 532 now points to all of the original data pool blocks and has a new entry for block 6 (e.g., storage extent 524) for the address range represented by the write operation.

However, as described above, the allocation of block five (5) may be used as a trigger for ownership change. MLU1 532 is no longer the owner of the data pool blocks originally allocated to it. Ownership has changed for these remaining blocks to the point-in-time backup to allow the original MLU, MLU1 532, to change over time while preserving the data state of that point-in-time copy. Accordingly, for the originally allocated blocks, the ownership has changed to the point-in-time copy, which is MLU2 536, as reflected within block structure pointer 534 by setting owner bit fields 212 to a zero (0) for dynamic allocation tracking storage extent numbering structures 208 at indexes zero (0), one (1), and three (3) (e.g., 0:2 at index zero, 0:4 at index one, and 0:3 at index three). This ownership change can also be seen within block structure pointer 538 by setting owner bit fields 212 to a one (1) for dynamic allocation tracking storage extent numbering structures 208 at indexes zero (0), one (1), and three (3) (e.g., 1:2 at index zero, 1:4 at index one, and 1:3 at index three). The allocation bit fields 206 of rows 502 through 512 illustrate the allocation of the respective storage extents.

As may be seen from the above description, multiple point-in-time copies may be made with very little overhead and may be preserved without extensive new memory allocations. The point-in-time copy may become the owner of shared blocks upon a new write operation that changes the original MLU definition, thereby, obviating a need to allocate entirely new sets of storage blocks for storage of point-in-time copies. Other blocks may remain shared blocks until new writes to the shared blocks occur, and new allocations may be made at the time storage is needed rather than at the time of the point-in-time copy. In this way, dynamic storage allocation may continue for many more point-in-time copies and with similarly compact representations.

As described above, similar transformations of storage space may be performed when data has been deleted from an MLU address range. Upon return of a data block to the pool, the associated allocation tracking fields may be returned to a default state and the block made available for new allocation on the next round of block allocations from the pool. As described above, a cyclical-synchronous allocation may be performed on the pool. As well, any other allocation mechanism for allocating noncontiguous blocks of storage from a storage pool may be performed and all are considered within the scope of this disclosure.

As described above, entire replicas of MLUs are also possible by allocation of sufficient new storage blocks to store all physical data associated with an MLU, including its pointer structures, and by changing the contents of the copied pointer structures to point to the respective copies of the storage extents. In this way, replicas may be made without any shared blocks. Replicas may be used for either local or remote archival of MLUs, including the associated data pointers, and for more enhanced recovery mechanisms. Replicas may also be used to create complete system state backup copies of MLU pool data. When a replica is made to an entirely different address space, the replica may be thought of as a facsimile, whether in the same or a different pool. When a facsimile is made to a different fault domain, it may be thought of as a complete clone of the original MLU.

The system described in FIG. 5 represents a system capable of performing the functionality as described herein for a large, highly granular system. Multiple layers of pointers may be used to expand the address space of an MLU. Accordingly, any and all pointer mechanisms capable of identifying storage locations in a storage pool are considered within the scope of the subject matter described herein.

FIGS. 6A-6D illustrate an exemplary dynamic allocation system 600 of moderate size and granularity for dynamically allocating storage extents from a storage extent pool and for MLU replication, storage, and retrieval according to an embodiment of the subject matter described herein. Exemplary dynamic allocation system 600 is based upon exemplary dynamic allocation system 300 for the case of moderate size and granularity. Accordingly, FIGS. 6A-6D may use a counter-based model to represent allocated storage extents within MLUs. However, an owner-based model may be used without departure from the subject matter described herein.

FIGS. 6A-6D focus on portions of system 600 used for MLU replication, storage, and retrieval. With the detailed description of MLU storage extent allocation and allocation tracking above, a detailed description of storage extent allocation will not be duplicated within FIGS. 6A-6D. Rather, FIGS. 6A-6D will focus on MLU-level data structures that may be used for replication, storage, and retrieval of MLUs from a replica vault. Accordingly, allocation tracking module 301 is not depicted in FIGS. 6A-6D. It is understood that representations of storage extent pointers within an MLU or a vault tracking module reference storage extents within a data pool, such as data storage pool 110 or a data storage pool in a replica vault, and that those storage extents refer to locations within physical disks of a RAID array, such as RAID array 310 or a RAID array within a replica vault, such as replica vault 316.

Figure 6A:
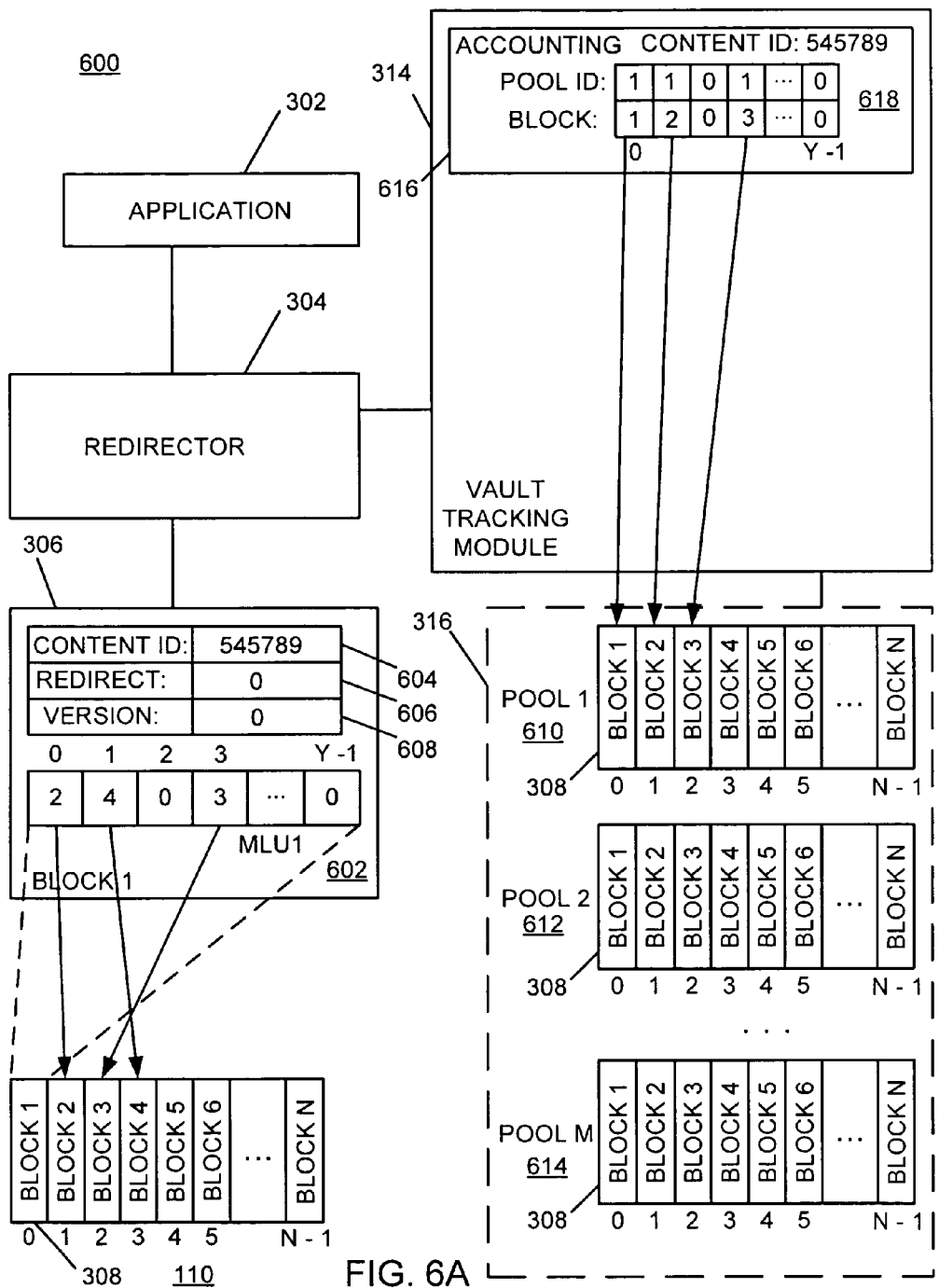
FIG. 6A is a block diagram of an exemplary dynamic allocation system after three storage extents have been allocated to an MLU and a replica has been made to a replica vault according to an embodiment of the subject matter described herein.

FIG. 6A illustrates exemplary dynamic allocation system 600 after three storage extents have been allocated to an MLU and a replica has been made to a replica vault. In FIG. 6A, application 302 is assumed to have written, via redirector 304, to three address ranges within MLU 306 that correspond to separate storage extents.

As can be seen from FIG. 6A, MLU 306 has a storage pointer structure 602 used to reference allocated data storage extents. As described above, a multi-layered pointer structure may be created and varied in size depending upon the desired addressability for MLU 306. For simplicity of description, storage pointer structure 602 represents a single-level storage pointer structure.

Storage pointer structure 602 is shown by the dashed lines in FIGS. 6A-6D to be stored in storage extent 1 (block 1) of local data pool 110. For illustrative purposes and assuming byte addressability, the three initial write operations will be assumed to have sequentially been to the first, fourth, and second 64K address segments of the address range addressable by MLU 306 (e.g., byte ranges 0-65,535; 196,608-262, 143; and 65,536-131,071, respectively). The address ranges are respectively indicated by elements 0, 3, and 1 of storage pointer structure 602.

MLU 306 is also shown in FIG. 6A to include a content identifier (content ID) field 604, a redirect field 606, and a version field 608. Content ID field 604 shows that the current content ID of MLU 306 is 545789. Content ID field 604 may be formatted in any manner capable of identifying the content of an MLU relative to other MLUs. Redirect field 606 may be a binary indication or any other type of indication suitable for determining whether data accesses to MLU 306 are to be redirected to an MLU stored in a replica vault, such as replica vault 316. Version field 608 may be formatted in any manner capable of referencing a version identifier for an archived MLU, such as for example a character string.

Replica vault 316 is shown to include multiple data storage pools. A pool 1 610, a pool 2 612, up to a pool M 614 are illustrated within replica vault 316. Replica vault 316 may include any number of data storage pools and may be organized across a single, or multiple, collections of physical disks that form either a single or multiple RAID arrays. Further, replica vault 316 may be a portion of the same RAID array 310 associated with data storage pool 110.

Pool 1 610, pool 2 612, and pool M 614 are shown to include data storage extents. For purposes of illustration, the pool sizes within replica vault 316 are chosen to include the same number of storage extents as data storage pool 110. However, with respect to the number of storage extents within a pool or within a replica vault, replica vaults may change in size over time by the addition or removal of disks or RAID groups. Accordingly, there may be more or fewer storage extents than are represented in a local storage pool, such as data storage pool 110.

Further, with respect to the size of data storage extents within a replica vault, for purposes of illustration, data storage extents 308 will be assumed to be of equal size for all data pools described within replica vault 316 and of equal size to storage extents 308 within data storage pool 110 (e.g., 64K bytes). However, storage extents within a replica vault may be any size suitable for storage of MLUs for archival purposes and may include any number of storage extents. Accordingly, storage extents within a replica vault may be much larger or may be smaller than storage extents within a local storage pool, such as data storage pool 110. By providing larger storage extents within a replica vault, such as replica vault 316, entire MLUs may be stored to and retrieved from single storage extents within the vault.

As described above, FIG. 6A illustrates the state of exemplary dynamic allocation system 600 after a replica of MLU 306 has been archived to replica vault 316. Accordingly, vault tracking module 314 is shown in FIG. 6A to include a vault tracking record 616 that may be used to reference the replica of MLU 306 within replica vault 316. Vault tracking record 616 is shown to include a name of "ACCOUNTING" and a content ID of 545789. The name associated with a replica may vary depending upon the needs of the system and the environment within which replicas are created. In FIGS. 6A-6D, an environment of an accounting department is assumed and the replica referenced within vault tracking record 616 is assumed to be the first replica created and stored to replica vault 316. The content ID within vault tracking record 616 is identical to that of content ID field 604 within MLU 306. Accordingly, the data content referred to by the two entities represents the same logical data organization and content. Vault tracking record 616 may be viewed to represent a point-in-time replica of MLU 306 stored within replica vault 316, as will be described in more detail below. Because replicas stored to replica vault 316 are for archival purposes, the name and content ID fields may be static values formatted in any manner useable by the system to identify replicas within replica vault 316.

A vault tracking structure 618 is illustrated as a pool identifier array and a block structure pointer array. Each array is shown to include Y elements, the number of elements within storage pointer structure 602 of MLU 306. However, as described above, there is no requirement that the number of elements within the structures of vault tracking module 314 be equal to the number of elements of storage pointer structure 602. Further, as with storage pointer structure 602, multiple layers of pointers may be used to expand the address ranges accessible by MLU 306. Accordingly, a similar hierarchy of storage extent pointers may also be archived within replica vault 316.

The pool identifier (ID) array of vault tracking structure 618 may include pool pointers to point to data storage pools within replica vault 316. Accordingly, pool ID array elements may point to pool 1 610, pool 2 612, up to pool M 614. As can be seen from FIG. 6A, pool ID elements at indexes zero (0), one (1), and three (3), each indicate a pointer reference to pool 1 610. Pool ID elements may include a multi-level structure to allow more pool references and may correlate with the number of block pointers in the block array of vault tracking structure 618. For simplicity of description, one level is assumed for the pool ID array of vault tracking structure 618.

The block structure pointer array within vault tracking structure 618 indicates that storage extents that indexes zero (0), one (1), and three (3), point to separate storage extents 308 within pool 1 610 at indexes zero (0), one (1), and two (2) (e.g., block 1, block 2, and block 3, respectively, within pool 1 610).

As can be seen from FIG. 6A, the allocation of storage extents within replica vault 316 may, but need not, be in a more contiguous fashion than the original dynamic allocations within MLU 306. Depending upon the current fragmentation of the data pools within replica vault 316, sequential allocations of data storage extents may be possible during a replication phase.

As can be seen from FIG. 6A, a complete replica of MLU 306 has been archived within pool 1 610 of replica vault 316. All data storage extents referenced within MLU 306 have been copied to replica vault 316 and vault tracking record 616 has been created to identify the location of the data associated with the replica within replica vault 316. This replica of MLU 306, referenced by vault tracking record 616, may be restored at any future point for access to the original data referenced by MLU 306 at the point of replication. MLU 306 may change over time and any changes may be referenced against vault tracking record 616 and the associated data referenced therein to identify a history for MLU 306. Vault tracking record 616 may have the same content ID as MLU 306 to indicate data equivalence between the two entities referenced. Vault tracking record 616 may be considered as the beginning point for a separate family tree within replica vault 316 and may be used in relation to any future data changes. By identifying entities using a content ID to represent that data contents of the entity, data equivalence may be identified between entities within replica vault 316 and MLUs within dynamic allocation system 600 by comparison of content IDs associated with the entities.

Figure 6B:
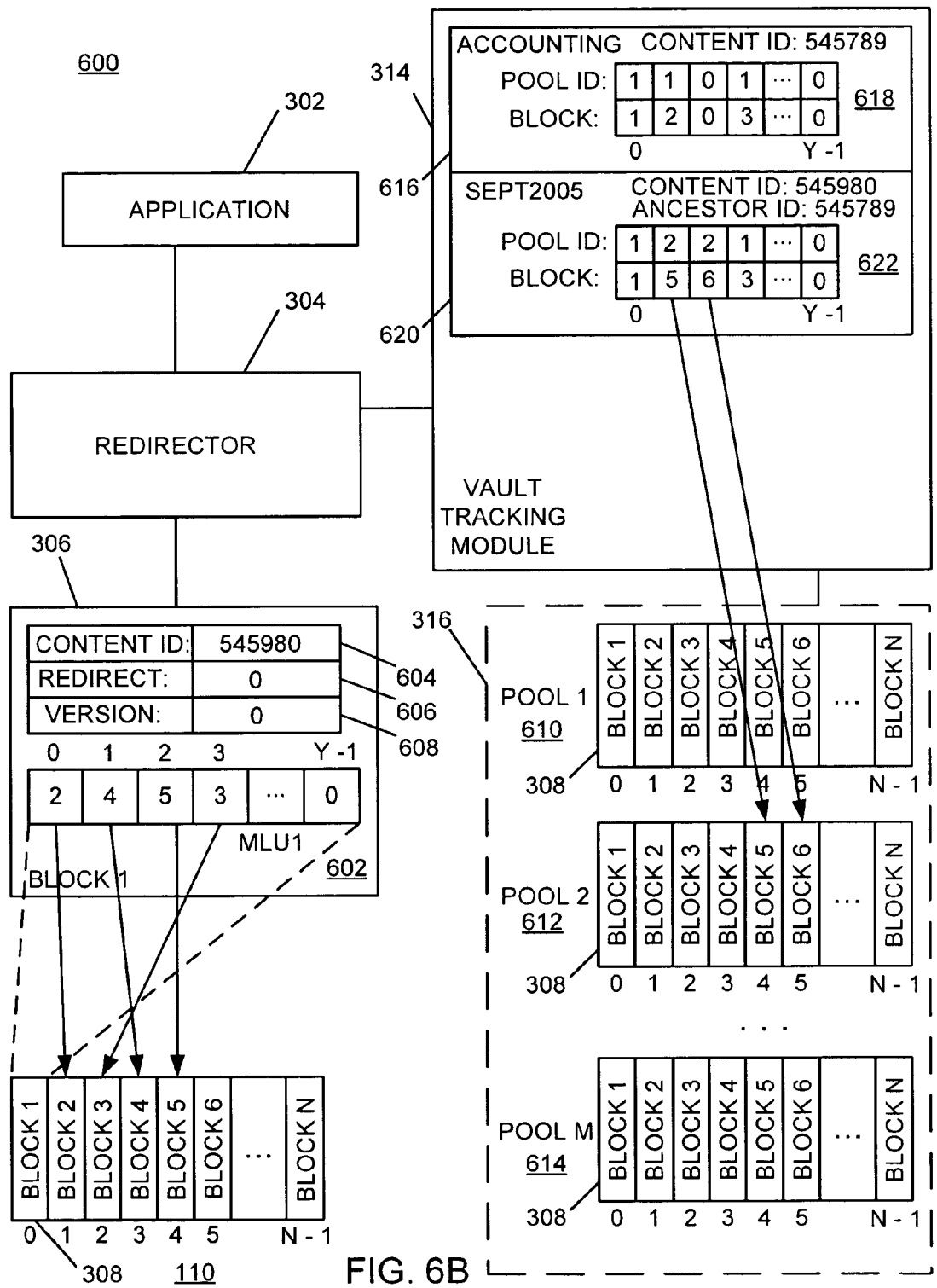
FIG. 6B is a block diagram of an exemplary dynamic allocation system after a change has been made to the data referenced by an MLU and a new replica has been made in replica vault according to an embodiment of the subject matter described herein.

FIG. 6B illustrates exemplary dynamic allocation system 600 after a change has been made to the data referenced by MLU 306 and a new replica has been made in replica vault 316. As can be seen from FIG. 6B, MLU 306 contains a new storage extent pointer at index two (2) of storage pointer structure 602. The storage extent pointer points to block 5 of data pool 110 and indicates that application 302 has written new data to the logical address range represented by index two (2) in storage pointer structure 602 (e.g., byte ranges 131,071-196,607). For purposes of illustration, the data in block four (4) associated with the structure pointer at index one (1) within storage pointer structure 602 will also be assumed to have been changed after the first replica was made to replica vault 316. Accordingly, two structure pointers within storage pointer structure 602 reference data that has changed since the first replica was made.

FIG. 6B also illustrates that a second replica of MLU 306 has been made and stored in replica vault 316. A new vault tracking record 620 has been created to reference the newly created replica. FIG. 6B shows that the replica has been given a name of "SEPT 2005." Accordingly, the name field within a vault tracking record, such as vault tracking record 620, may be used indicate the point and time at which a replica was created and, by use of a content ID and an ancestor ID, as will be described below, may reference an initial or earlier replica to create a history for the data associated with the set of replicas.

As can be seen from FIG. 6B, both MLU 306 and vault tracking record 620 show a new content ID stored in content ID field 604 within MLU 306 and as a fixed identifier within vault tracking record 620. Whenever a change is made to an MLU that has been replicated and archived to a replica vault, such as replica vault 316, the content ID may be changed to indicate that there is new data content referenced by the MLU. In order to track changes within replica vault 316, a fixed ancestor ID may be associated with a vault tracking record for any vault tracking records that are derived from initially archived vault tracking records. For example, vault tracking record 620 references a replica of MLU 306 that may be thought of as a child of the replica referenced by vault tracking record 616. Accordingly, vault tracking record 620 has the ancestor ID field referencing the content ID of the parent vault tracking record 616, as shown by ancestor ID 545789 within vault tracking record 620.

As described above, FIG. 6B also illustrates that data within block four (4) referenced by index one (1) within storage pointer structure 602 has been changed since the last replication and that a new storage extent in block five (5) has been allocated and written. Accordingly, when MLU 306 was replicated to replica vault 316, two storage extents were allocated within replica vault 316. Vault tracking structure 622 illustrates that the storage extents allocated within replica vault 316 were allocated from pool 2 612 at blocks five (5) and six (6), respectively.

Figure 6C:
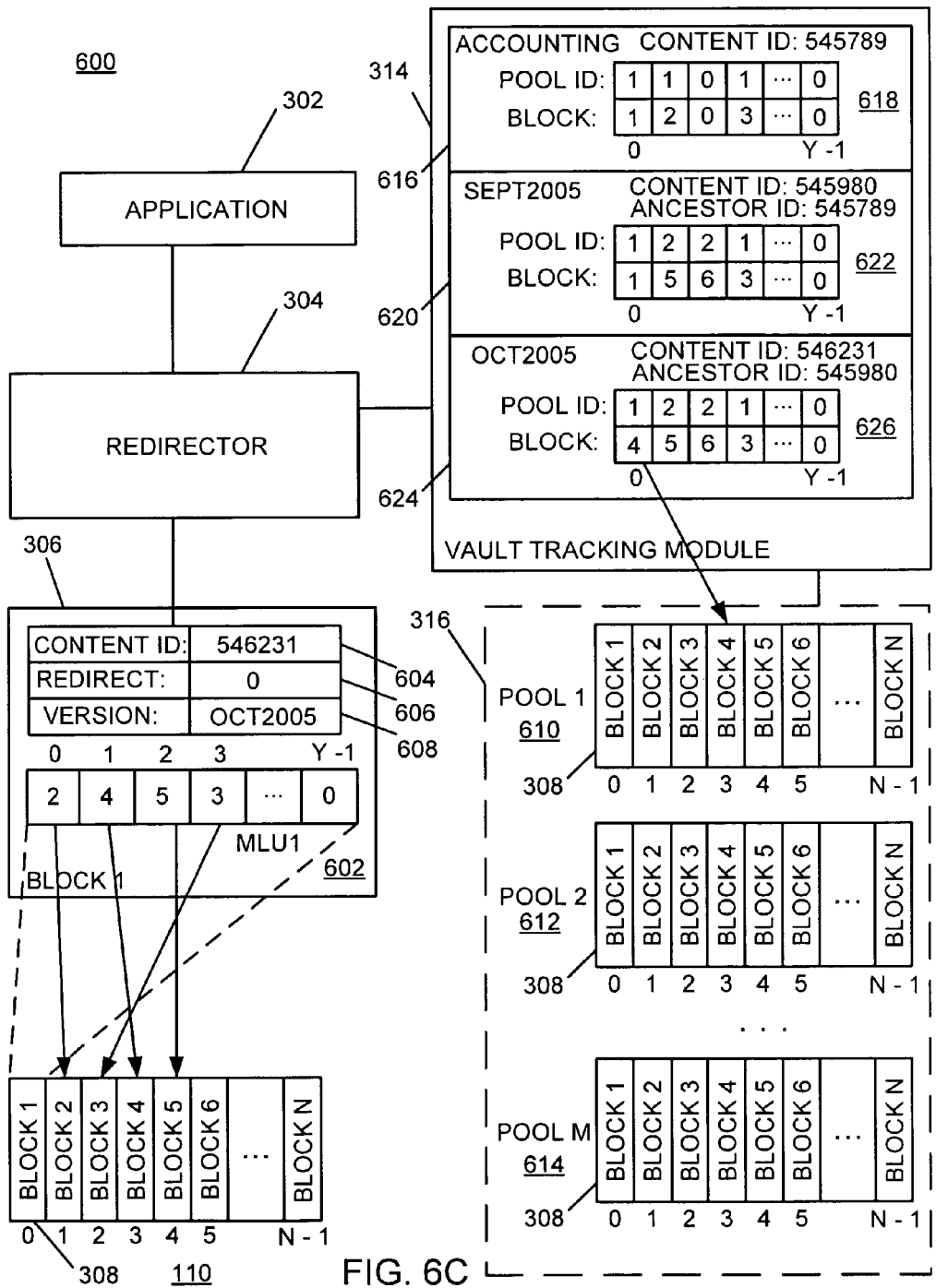
FIG. 6C is a block diagram of an exemplary dynamic allocation system operating to create another replica and to store that replica in a replica vault according to an embodiment of the subject matter described herein.

FIG. 6C illustrates exemplary dynamic allocation system 600 after application 302 has written new data to one storage extent referenced by MLU 306 and a new replica of MLU 306 has been made.

A new vault tracking record 624 is shown within vault tracking module 314. Vault tracking record 624 has a name of "OCT 2005." Vault tracking record 624 also shows a content ID of 546231, which matches the content ID field 604 within MLU 306. Accordingly, the content referenced by MLU 306 and vault tracking record 624 are identical. Vault tracking record 624 shows that a new block in pool 1 610 at block four (4) has been allocated and referenced at index zero (0) within vault tracking structure 626 to store the data associated with the changed data referenced by the storage pointer at index zero (0) within storage pointer structure 602 of MLU 306.

It should be noted that these storage extents allocated in pool 1 610, referenced in FIG. 6A, and the storage extents allocated in FIG. 6B in pool 2 612, were from different pools and were noncontiguous. However, the storage extent allocated in FIG. 6C was contiguous with respect to the initial three allocations of FIG. 6A. This contiguous allocation in FIG. 6C may be due to a defragmentation of pool 1 610 or a deletion of another replica which allowed block four (4) of pool 1 610 to be available for the replica referenced in vault tracking record 624, whereas, block four (4) may not have been available for allocation for the replica referenced in vault tracking record 620. Defragmentation procedures may operate as a background task to move data to contiguous storage extents as data in the vault expands and contracts over time.

Vault tracking record 624 includes an ancestor ID of 545980 which references the content ID of vault tracking record 620. Accordingly, vault tracking record 624 represents a replica that may be viewed as a child of the replica generated and referenced within vault tracking record 620.

Figure 6D:
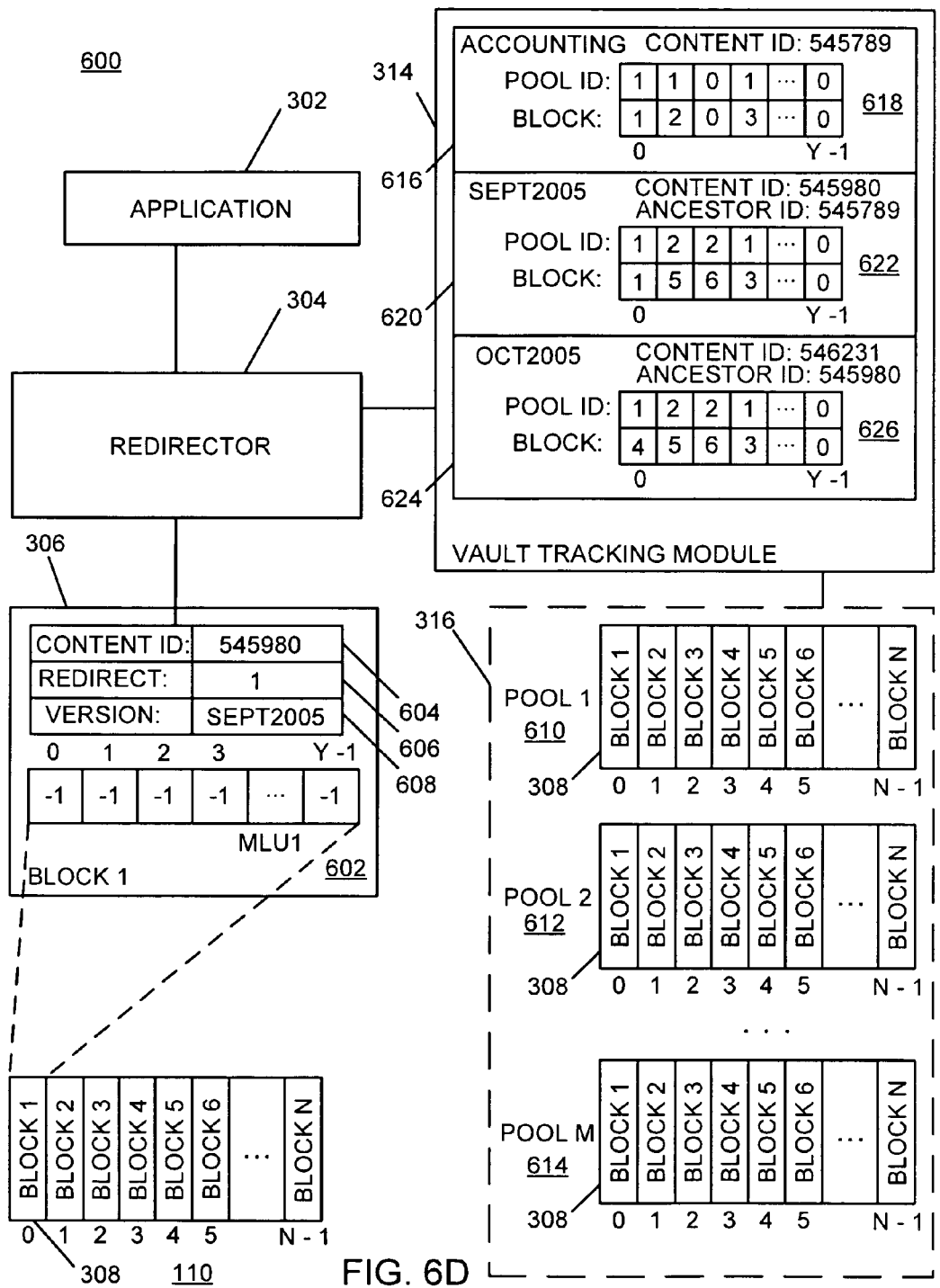
FIG. 6D is a block diagram of an exemplary dynamic allocation system when redirection is operative for an MLU to implement a rollback operation according to an embodiment of the subject matter described herein.

FIG. 6D illustrates exemplary dynamic allocation system 600 when redirection is operative for MLU 306 to implement a rollback operation. As described above, any new data written to an MLU during redirection may be stored either locally within data storage pool 110 or within replica vault 316.

A rollback operation involves accessing an older replica stored within replica vault 316 either to pull the replica back from the vault or to access it for temporary purposes. Because FIG. 6D illustrates a rollback to a replica within replica vault 316, the content ID field 604 of MLU 306 has been set to indicate that MLU 306 references content associated with content ID 545980 which was replicated to replica vault 316 and referenced by vault tracking record 620. Redirection field 606 has been set to indicate that redirector 304 should redirect any read accesses to replica vault 316 and version field 608 has been updated to reference "SEPT2005," the replica referenced by vault tracking record 620.

As can be seen from FIG. 6D, the storage pointers referenced by storage pointer structure 602 have been set to negative one (e.g., "−1") to indicate that a redirection operation is in process and that any accesses to the respective logical address locations should be issued to replica vault 316 rather than data storage pool 110. Other settings for the storage pointers within storage pointer structure 602 are possible.

Alternatively, a new MLU may be created for a rollback operation and MLU 306 may be kept intact with storage pointer structure 602, content ID field 604, redirection field 606, and version field 608 unchanged. In this way, the rollback operation may be completed without disturbing the current state of MLU 306.

As well, data associated with a rollback may be copied back to data storage pool 110 for use either prior to accessing the replica or as a background task. In either case, storage extent pointers within storage pointer structure 602 may be updated when data has been copied back to data storage pool 110 to reflect the location within data storage pool 110 that stores the data. When the data is copied prior to accessing the rolled back replica, replica read accesses may be directed to data storage pool 110. However, when data is copied as a background task, read accesses to regions still resident on replica vault 316 during the background copy process may be completed via read accesses to storage locations within replica vault 316. When the data has been copied back to data storage pool 110, read accesses may be directed to the data storage pool 110.

Collectively, FIGS. 6A-6D illustrate several replication possibilities for exemplary dynamic allocation system 600. Other uses of dynamic allocation system 600 are possible and all are considered when in the scope of the subject matter described herein. For example, when an MLU, such as MLU 306 is redirected to a replica archived in a replica vault, such as replica vault 316, application 302, via redirector 304, may access the replica within the vault and the replica may be propagated back to a local data pool, such as data pool 110, as a background operation. Accordingly, overtime the entire MLU may be moved back to a local data pool while providing active use of the data without a lag associated with copy propagation.

Another possibility for reducing storage requirements for replication of MLUs may be to associate a compact digital signature, such as for example an MD5 message digest or comparable signature, with each chunk of data stored to a replica vault. By maintaining a catalog of signatures for all data blocks stored within a vault, anti-duplication software may be run within vault tracking module 314 to reduce duplication of data for MLU replication purposes. When data that is identical to data being archived is already stored somewhere within the vault, that stored data may be referenced by a new replica rather than writing the data to the vault again. Accordingly, a vault tracking module may use anti-duplication software during the replication process and increased storage efficiency may result.

Figure 7:
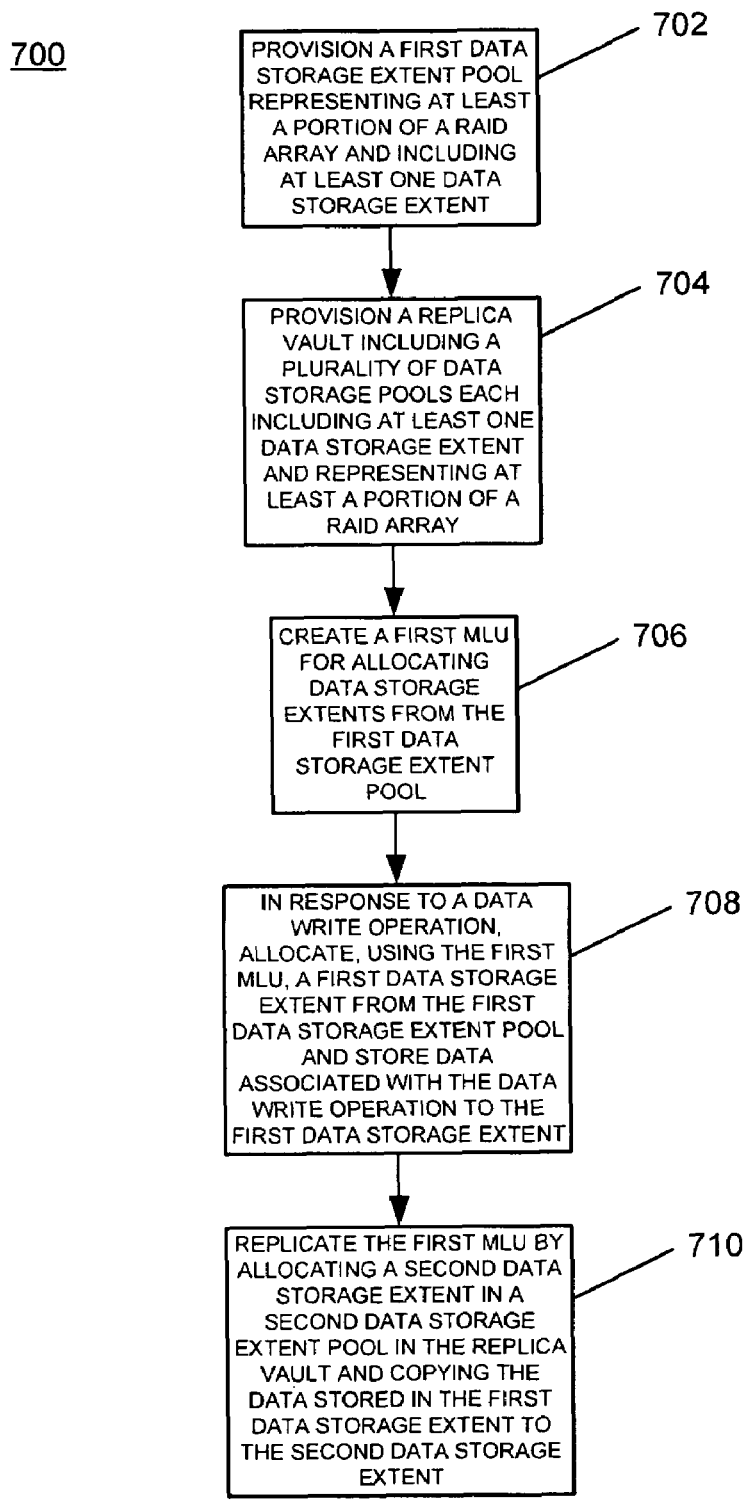
FIG. 7 is a flow chart illustrating exemplary steps by which an MLU may be replicated, stored, and retrieved according to an embodiment of the subject matter described herein.

FIG. 7 illustrates an exemplary dynamic allocation process 700 for MLU replication, storage, and retrieval. At block 702, process 700 may provision a first data storage extent pool representing at least a portion of a RAID array and including at least one storage extent. For example, a data storage pool, such as storage pool 110, may be provisioned including at least one storage extent 308.

At block 704, process 700 may provision a replica vault including a plurality of data storage pools each including at least one data storage extent and representing at least a portion of a RAID array. For example, a replica vault, such as replica vault 316, may be provisioned including pool 1 610, pool 2 612, up to pool M 614, each including data storage extents 308.

At block 706, process 700 may create a first MLU for allocating data storage extents from the first data storage extent pool. For example, MLU 306 may be created to allocate storage extents from storage pool 110.

At block 708, process 700 may, in response to a data write operation, allocate, using the first MLU, a first data storage extent from the first data storage extent pool and store data associated with the data write operation to the first data storage extent. For example, MLU 306 may, in response to a data write operation from application 302, allocate a storage extent from storage pool 110 and write the associated data to the allocated storage extent.

At block 710, process 700 may replicate the first MLU by allocating a second data storage extent in a second data storage extent pool in the replica vault and copying the data stored in the first data storage extent to the second data storage extent. For example, MLU 306 may be replicated to replica vault 316 by allocating a storage extent within in pool 1 610 in replica vault 316 and copying the data stored in a storage extent in storage pool 110 to a storage extent in pool 1 610.

Figure 8:
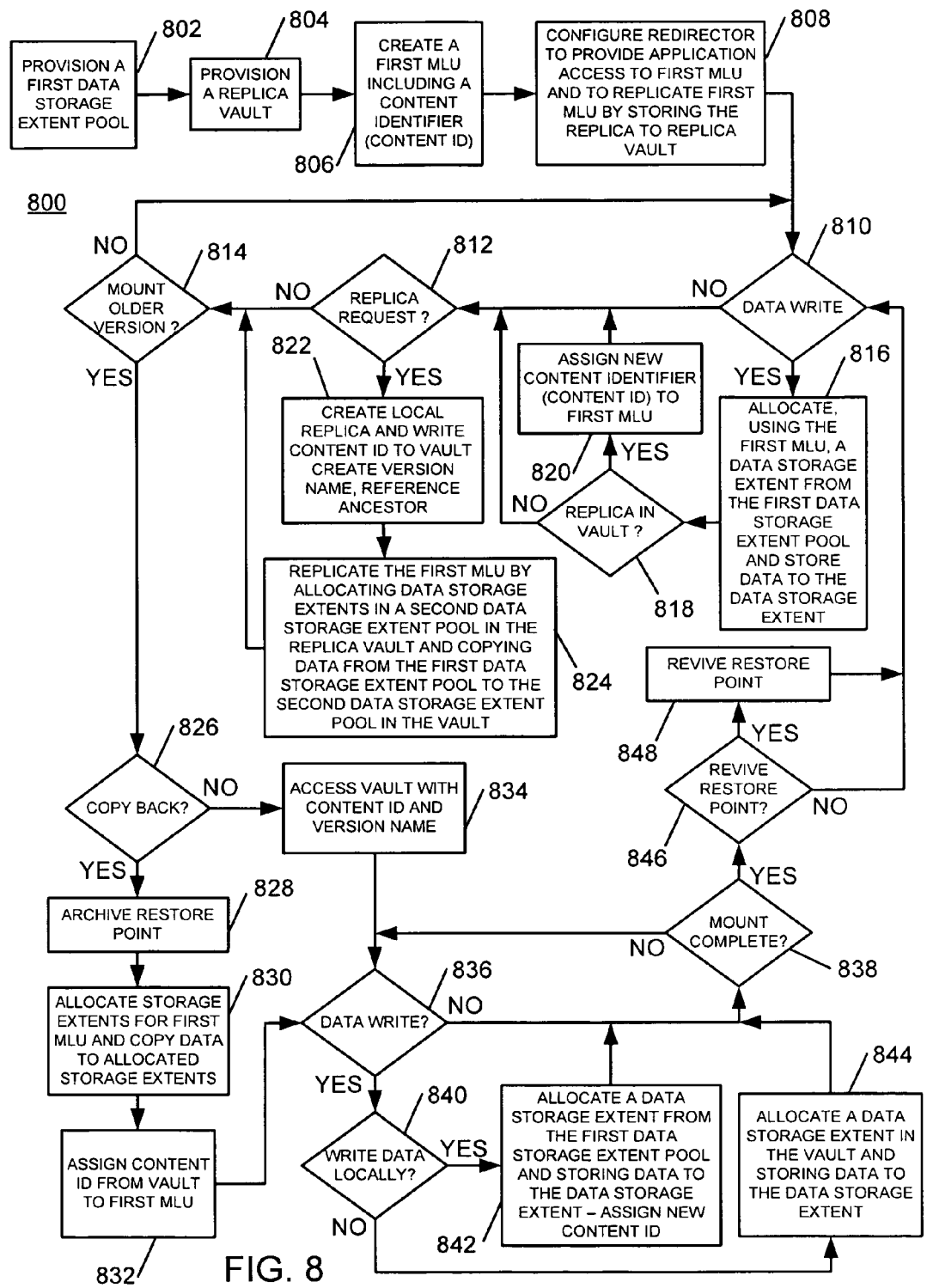
FIG. 8 is a flow chart illustrating exemplary steps by which replicated MLUs may be archived to a replica vault, by which older versions of replicas stored in the replica vault may be mounted, and for migrating MLUs and replicas between a local data pool and a replica vault according to an embodiment of the subject matter described herein.

FIG. 8 illustrates an exemplary dynamic allocation process 800 for archiving replicated MLUs to a replica vault, mounting older versions of replicas stored in the replica vault, and for migrating MLUs and replicas between a local data pool and the replica vault. At block 802, process 800 may provision a first data storage extent pool. At block 804, a replica vault may be provisioned. At block 806, a first MLU may be created including a content identifier (content ID). A redirector may be configured at block 808 to provide application access to the first MLU and to replicate the first MLU by storing the replica to the replica vault.

At decision point 810, process 800 may determine whether an application data write is requested. When no application data write is currently requested, process 800 may determine whether there is a replica request at decision point 812. This replica request may be scheduled periodically or may be requested in an on-demand manner from an administrator. When no replica has been requested at decision point 812, process 800 may determine whether a request to mount an older version of an MLU has been issued at decision point 814. When no mount request has been issued, process 800 may return to decision point 810 to determine whether a new data write operation has been requested.

When process 800 determines that a data write operation has been requested at decision point 810, it may allocate, using the first MLU, a data storage extent from the first data storage extent pool and store the data associated with the data write operation to the data storage extent at block 816. At decision point 818, process 800 may determine whether a replica associated with the MLU presently exists within the replica vault. When a replica does exist within the replica vault, a new content ID may be assigned to the first MLU at block 820 to begin tracking diversions between the replica and the first MLU. Alternatively, the content ID may be changed when a snapshot is taken. When no replica has been stored to the vault, as determined at decision point 818, or when a new content ID has been assigned at block 820, process 800 may again return to decision point 812 to determine whether there has been a replica request.

When a replica request has been identified at decision point 812, a local replica may be created and preserved to maintain the state of the replica stored to the vault to provide a consistent data set for the storage operation and the content ID associated with the MLU may be written to the replica vault, a version name for the replica may be created, and a reference may be created to an ancestor if one exists within the replica vault, and these identifiers may be stored in a vault tracking module within or co-located with the replica vault at block 822. At block 824, processor 800 may replicate the first MLU by allocating data storage extents in a second data storage extent pool in the replica vault and by copying data from the first data storage extent pool to the second data storage extent pool in the vault. Processor 800 may return to decision point 814 to determine whether a request has been issued to mount an older version of a replica stored in the vault.

When a request has been issued to mount an older version of the replica stored in the replica vault, as determined at decision point 814, process 800 may determine at decision point 826 whether data associated with the replica is to be copied back to the first local data storage extent pool or whether the data is to be accessed on the vault. As described above, the data stored in the vault within a replica may be accessed immediately, subject to vault access latency, without copying the data back to the local storage pool, and the data may be copied back to the local storage pool as a background operation. However, to simplify the description, process 800 is depicted within FIG. 8 to choose either to copy the data back or to access the vault.

When a decision is made at decision point 826 to copy data back from the vault to the first local data storage extent pool, a restored point may be archived at block 828 and storage extents may be allocated for the first MLU within the first local data storage extent pool and data may be copied to the allocated storage extents at block 830. At block 832, a content ID associated with the replica may be assigned from the vault to the first MLU. Data may be copied back from the vault for use either prior to accessing the data associated with the replica or may be copied as a background task. When the data is copied prior to accessing the data associated with the replica, replica read accesses may be directed to a local data storage pool where the data has been copied. However, when data is copied as a background task, read accesses to regions still resident on the vault during the background copy process may be completed via read accesses to storage locations within the vault. When the data has been copied back to the local data storage pool, read accesses may be directed to the local data storage pool.

When a decision has been made at decision point 826 not to copy data back from the vault, data within the vault may be accessed with the content ID and a version name associated with the replica at block 834. In response to either assigning a content ID from the vault to the MLU at block 832 or accessing the vault with the content ID and version name at block 834, process 800 may determine whether a data write has been requested for the MLU at decision point 836. When a data write operation has not been requested, process 800 may determine whether the mount operation is complete at decision point 838.

When a mount operation is not complete, process 800 may return to decision point 836 to again determine whether a write operation has been requested for the replica at decision point 836. When a write operation has been requested, a decision may be made at decision point 840 as to whether the data is to be written locally or to the replica vault. When data is to be written locally, the first MLU may allocate a data storage extent from the first local data storage extent pool and store data to the storage extent at block 842. A new content ID may also be associated with the first MLU at block 842 to track divergence of the first MLU from that of the replica is mounted. When data is not to be written locally, a data storage extent may be allocated in the replica vault and the data may be stored to the allocated storage extent at block 844. In response to either storing the data locally at block 842 or in the replica vault at block 844, process 800 may again return to decision point 838 to determine whether the mount of the replica is complete.

When the mount operation has completed, a decision may be made at decision point 846 as to whether to revive the restore point archived at block 828. When the restore point is to be revived, revival of the restore point may be performed at block 848. In response to a decision not to revive the restore point at decision point 486 or upon revival the restore point at block 848, process 800 may again return to decision point 810 to determine whether a new write request has been issued for the MLU. Process 800 may again iterate to replicate the MLU or mount older versions of the MLU and to write new data to the MLU as requested.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for mapped logical unit (MLU) replication, storage, and retrieval in a redundant array of inexpensive disks (RAID) environment, the method comprising:
   (a) provisioning a first data storage extent pool representing at least a portion of a RAID array and including at least one data storage extent;
   (b) provisioning a replica vault including a second data storage extent pool including at least one data storage extent and representing at least a portion of a RAID array;
   (c) creating a first mapped logic unit (MLU) for dynamically allocating contiguous or non-contiguous data storage extents from the first data storage extent pool;
   (d) in response to a first data write operation, allocating, using the first MLU, a first data storage extent from the first data storage extent pool and storing data associated with the first data write operation in the first data storage extent;
   (e) replicating the first MLU to create a second MLU by allocating a second data storage extent in the second data storage extent pool in the replica vault and copying the data stored in the first data storage extent to the second data storage extent; and
   (f) after a change to the first MLU, replicating the second MLU to create a third MLU by allocating a third data storage extent in the second data storage extent pool in the replica vault and storing in the third data storage extent the changed portions and not the unchanged portions of the first MLU, wherein the second MLU and the third MLU both point to a data storage extent in the second data storage extent pool that contains an unchanged portion of the data from the first write operation.

2. The method of claim 1 wherein creating the first MLU includes associating a content identifier field including a first content identifier with the first MLU to identify data stored in the first data storage extent.

3. The method of claim 1 wherein creating the first MLU includes associating a content identifier field including a first content identifier with the first MLU to identify data stored in the first data storage extent, associating a redirection indicator with the first MLU to indicate redirection of data accesses directed toward the first MLU to the second MLU stored in the replica vault, and a version identifier field to identify a version identifier for the second MLU.

4. The method of claim 1 wherein replicating the first MLU to create the second MLU includes replicating the first MLU in response to a scheduled event.

5. The method of claim 1 wherein replicating the first MLU to create the second MLU includes replicating the first MLU in response to a non-scheduled event.

6. A method for mapped logical unit (MLU) replication, storage, and retrieval in a redundant array of inexpensive disks (RAID) environment, the method comprising:
  (a) provisioning a first data storage extent pool representing at least a portion of a RAID array and including at least one data storage extent;
  (b) provisioning a replica vault including a second data storage extent pool including at least one data storage extent and representing at least a portion of a RAID array;
  (c) creating a first mapped logic unit (MLU) for allocating data storage extents from the first data storage extent pool;
  (d) in response to a first data write operation, allocating, using the first MLU, a first data storage extent from the first data storage extent pool and storing data associated with the first data write operation in the first data storage extent; and
  (e) replicating the first MLU to create a second MLU by allocating a second data storage extent in the second data storage extent pool in the replica vault and copying the data stored in the first data storage extent to the second data storage extent, wherein creating the first MLU includes associating a redirection indicator with the first MLU and wherein the method further comprises, detecting a replica mount operation, and, in response to the replica mount operation, setting the redirection indicator to indicate that data accesses directed to the first MLU are to be redirected to the second MLU in the replica vault.

7. A method for mapped logical unit (MLU) replication, storage, and retrieval in a redundant array of inexpensive disks (RAID) environment, the method comprising:
  (a) provisioning a first data storage extent pool representing at least a portion of a RAID array and including at least one data storage extent;
  (b) provisioning a replica vault including a second data storage extent pool including at least one data storage extent and representing at least a portion of a RAID array;
  (c) creating a first mapped logic unit (MLU) for allocating data storage extents from the first data storage extent pool;
  (d) in response to a first data write operation, allocating, using the first MLU, a first data storage extent from the first data storage extent pool and storing data associated with the first data write operation in the first data storage extent; and
  (e) replicating the first MLU to create a second MLU by allocating a second data storage extent in the second data storage extent pool in the replica vault and copying the data stored in the first data storage extent to the second data storage extent, wherein creating the first MLU includes associating a version identifier field and a redirection indicator with the first MLU, and wherein the method further comprises, determining whether the redirection indicator indicates that accesses to the first MLU should be redirected to the second MLU, and, in response to detecting the indication in the redirection indicator to redirect accesses directed to the first MLU to the second MLU in the replica vault, copying a version name associated with the second MLU to the version identifier field associated with the first MLU.

8. A method for mapped logical unit (MLU) replication, storage, and retrieval in a redundant array of inexpensive disks (RAID) environment, the method comprising:
  (a) provisioning a first data storage extent pool representing at least a portion of a RAID array and including at least one data storage extent;
  (b) provisioning a replica vault including a second data storage extent pool including at least one data storage extent and representing at least a portion of a RAID array;
  (c) creating a first mapped logic unit (MLU) for allocating data storage extents from the first data storage extent pool;
  (d) in response to a first data write operation, allocating, using the first MLU, a first data storage extent from the first data storage extent pool and storing data associated with the first data write operation in the first data storage extent; and
  (e) replicating the first MLU to create a second MLU by allocating a second data storage extent in the second data storage extent pool in the replica vault and copying the data stored in the first data storage extent to the second data storage extent,
  wherein creating the first MLU includes associating a content identifier field including a first content identifier with the first MLU to identify data stored in the first data storage extent, and wherein replicating the first MLU includes, within a vault tracking module associated with the replica vault, creating a first vault tracking record by copying the first content identifier stored in the content identifier field associated with the first MLU to the first vault tracking record and creating a first version name within the first vault tracking record to identify the second MLU.

9. The method of claim 8 comprising detecting a second data write operation to the first MLU, and, in response to the second data write operation, storing data associated with the first data write operation in the first data storage extent and storing a second content identifier in the content identifier field associated with the first MLU to indicate that the data referenced by the first MLU has changed.

10. The method of claim 9 comprising replicating the first MLU to create a third MLU by allocating a third data storage extent in the second data storage extent pool in the replica vault and copying the data stored in the first data storage extent to the third data storage extent.

11. The method of claim 10 wherein replicating the first MLU to create the third MLU includes, within the vault tracking module associated with the replica vault, creating a second vault tracking record by copying the second content identifier stored in the content identifier field associated with the first MLU to the second vault tracking record, creating a second version name within the second vault tracking record to identify the third MLU, and creating an ancestor identifier within the second vault tracking record by copying the first content identifier from the first vault tracking record to the second vault tracking record.

12. The method of claim 8 comprising detecting a second data write operation to the first MLU, and, in response to the second data write operation, allocating a third data storage extent in the first data storage pool, storing data associated with the second data write operation in the third data storage extent, and storing a second content identifier in the content identifier field associated with the first MLU to indicate that the data referenced by the first MLU has changed.

13. The method of claim 12 comprising replicating the first MLU to create a third MLU by allocating a fourth data storage extent in the second data storage extent pool in the replica vault and copying the data stored in the third data storage extent to the fourth data storage extent.

14. The method of claim 13 wherein replicating the first MLU to create the third MLU includes, within the vault tracking module associated with the replica vault, creating a second vault tracking record by copying the second content identifier stored in the content identifier field associated with the first MLU to the second vault tracking record, creating a second version name within the second vault tracking record to identify the third MLU, and creating an ancestor identifier within the second vault tracking record by copying the first content identifier from the first vault tracking record to the second vault tracking record.

15. A method for mapped logical unit (MLU) replication, storage, and retrieval in a redundant array of inexpensive disks (RAID) environment, the method comprising:
    (a) provisioning a first data storage extent pool representing at least a portion of a RAID array and including at least one data storage extent;
    (b) provisioning a replica vault including a second data storage extent pool including at least one data storage extent and representing at least a portion of a RAID array;
    (c) creating a first mapped logic unit (MLU) for allocating data storage extents from the first data storage extent pool;
    (d) in response to a first data write operation, allocating, using the first MLU, a first data storage extent from the first data storage extent pool and storing data associated with the first data write operation in the first data storage extent; and
    (e) replicating the first MLU to create a second MLU by allocating a second data storage extent in the second data storage extent pool in the replica vault and copying the data stored in the first data storage extent to the second data storage extent,
    wherein creating the first MLU includes associating a content identifier field including a first content identifier with the first MLU to identify data stored in the first data storage extent, associating a redirection indicator with the first MLU to indicate redirection of data accesses directed toward the first MLU to the second MLU stored in the replica vault, and a version identifier field to identify a version identifier for the second MLU, and wherein replicating the first MLU includes, within a vault tracking module associated with the replica vault, creating a first vault tracking record by copying the first content identifier stored in the content identifier field associated with the first MLU to the first vault tracking record and creating a first version name within the first vault tracking record to identify the second MLU.

16. The method of claim 15 comprising, detecting a replica mount operation, and, in response to detecting the replica mount operation, setting the redirection indicator to indicate that data accesses directed toward the first MLU are to be redirected to an MLU within the replica vault and copying the first version name from the first vault tracking record to the version identifier field within the first MLU to identify the second MLU as the MLU within the replica vault that the data accesses directed toward the first MLU are to be redirected to.

17. The method of claim 16 comprising, in response to a first data read operation directed toward the first MLU, retrieving data from the second MLU in the replica vault based upon the redirection indicator and the first version name in the version identifier field within the first MLU.

18. The method of claim 17 comprising, copying data stored in the second data storage extent to the first data storage extent as a background task and, upon completion of the copying, clearing the redirection indicator and the version identifier filed within the first MLU and, in response to a second data read operation directed toward the first MLU, retrieving data from the first data storage extent.

19. The method of claim 18 comprising copying the content identifier from the first vault tracking record associated with the data copied from the second data storage extent to the first data storage extent to the content identifier field associated with the first MLU.

20. The method of claim 16 comprising, in response to a second data write operation, allocating a third data storage extent in the second data storage extent pool in the replica vault and storing data associated with the second data write operation to the third data storage extent.

21. The method of claim 16 comprising, in response to a second data write operation, allocating a third data storage extent in the first data storage extent pool and storing data associated with the second data write operation to the third data storage extent.

22. A system for mapped logical unit (MLU) replication, storage, and retrieval in a redundant array of inexpensive disks (RAID) environment, the system comprising:
    (a) a first data storage extent pool representing at least a portion of a RAID array and including at least one data storage extent;
    (b) a replica vault including a second data storage extent pool including at least one data storage extent and representing at least a portion of a RAID array; and
    (c) a first mapped logic unit (MLU) for dynamically allocating contiguous or non-contiguous data storage extents in a data storage extent pool, wherein the first MLU is adapted to:
        (i) allocate, in response to a data write operation, a first data storage extent from the first data storage extent pool;
        (ii) store data associated with the first data write operation in the first data storage extent; and
        (iii) replicate the first MLU to create a second MLU by allocating a second data storage extent in a second data storage extent pool in the replica vault and copying the data stored in the first data storage extent to the second data storage extent,
    wherein, after a change to the first MLU, the replica vault is adapted to replicate the second MLU to create a third MLU by allocating a third data storage extent in the second data storage extent pool in the replica vault and storing in the third data storage extent the changed portions and not the unchanged portions of the first MLU, wherein the second MLU and the third MLU both point to the data storage extent in the second data storage extent pool that contains unchanged portions of the data from the first write operation.

23. The system of claim 22 wherein the first MLU is adapted to maintain a content identifier field having a first content identifier to identify data stored in the first data storage extent.

24. The system of claim 22 wherein the first MLU is adapted to replicate the first MLU to create the second MLU in response to a scheduled event.

25. The system of claim 22 wherein the first MLU is adapted to replicate the first MLU to create the second MLU in response to a non-scheduled event.

26. A system for mapped logical unit (MLU) replication, storage, and retrieval in a redundant array of inexpensive disks (RAID) environment, the system comprising:
  (a) a first data storage extent pool representing at least a portion of a RAID array and including at least one data storage extent;
  (b) a replica vault including a second data storage extent pool including at least one data storage extent and representing at least a portion of a RAID array; and
  (c) a first mapped logic unit (MLU) adapted to:
    (i) allocate, in response to a data write operation, a first data storage extent from the first data storage extent pool;
    (ii) store data associated with the first data write operation in the first data storage extent; and
    (iii) replicate the first MLU to create a second MLU by allocating a second data storage extent in a second data storage extent pool in the replica vault and copying the data stored in the first data storage extent to the second data storage extent, and
  wherein the first MLU is adapted to store a redirection indicator and to, in response to a replica mount operation, set the redirection indicator to indicate that data accesses directed to the first MLU are to be redirected to the second MLU in the replica vault.

27. A system for mapped logical unit (MLU) replication, storage, and retrieval in a redundant array of inexpensive disks (RAID) environment, the system comprising:
  (a) a first data storage extent pool representing at least a portion of a RAID array and including at least one data storage extent;
  (b) a replica vault including a second data storage extent pool including at least one data storage extent and representing at least a portion of a RAID array; and
  (c) a first mapped logic unit (MLU) adapted to:
    (i) allocate, in response to a data write operation, a first data storage extent from the first data storage extent pool;
    (ii) store data associated with the first data write operation in the first data storage extent; and
    (iii) replicate the first MLU to create a second MLU by allocating a second data storage extent in a second data storage extent pool in the replica vault and copying the data stored in the first data storage extent to the second data storage extent, and
  wherein the first MLU is adapted to maintain a version identifier field and to store a redirection indicator, and in response to an indication in the redirection indicator to redirect accesses directed toward the first MLU to the second MLU in the replica vault, copy a version name associated with the second MLU to the version identifier field.

28. A system for mapped logical unit (MLU) replication, storage, and retrieval in a redundant array of inexpensive disks (RAID) environment, the system comprising:
  (a) a first data storage extent pool representing at least a portion of a RAID array and including at least one data storage extent;
  (b) a replica vault including a second data storage extent pool including at least one data storage extent and representing at least a portion of a RAID array; and
  (c) a first mapped logic unit (MLU) adapted to:
    (i) allocate, in response to a data write operation, a first data storage extent from the first data storage extent pool;
    (ii) store data associated with the first data write operation in the first data storage extent; and
    (iii) replicate the first MLU to create a second MLU by allocating a second data storage extent in a second data storage extent pool in the replica vault and copying the data stored in the first data storage extent to the second data storage extent,
  wherein the first MLU is adapted to maintain a content identifier field having a first content identifier to identify data stored in the first data storage extent, and comprising a vault tracking module associated with the replica vault and wherein the first MLU is adapted to, as part of replicating the first MLU to create a second MLU, create a first vault tracking record by copying the first content identifier stored in the content identifier field associated with the first MLU to the first vault tracking record and to create a first version name within the first vault tracking record to identify the second MLU.

29. The system of claim 28 wherein, in response to a second data write operation, the first MLU is adapted to store data associated with the second data write operation in the first data storage extent and to store a second content identifier in the content identifier field to indicate that the data referenced by the first MLU has changed.

30. The system of claim 29 wherein the first MLU is adapted to replicate the first MLU to create a third MLU by allocating a third data storage extent in the second data storage extent pool in the replica vault and copying the data stored in the first data storage extent to the third data storage extent.

31. The system of claim 30 wherein the first MLU is adapted to create, as part of replicating the first MLU to create the third MLU and within the vault tracking module associated with the replica vault, a second vault tracking record by copying the second content identifier stored in the content identifier field associated with the first MLU to the second vault tracking record, to create a second version name within the second vault tracking record to identify the third MLU, and to create an ancestor identifier within the second vault tracking record by copying the first content identifier from the first vault tracking record to the second vault tracking record.

32. The system of claim 28 wherein the first MLU is adapted to, in response to a second data write operation, allocate a third data storage extent in the first data storage pool, store data associated with the second data write operation in the third data storage extent, and store a second content identifier in the content identifier field to indicate that the data referenced by the first MLU has changed.

33. The system of claim 32 wherein the first MLU is adapted to replicate the first MLU to create a third MLU by allocating a fourth data storage extent in the second data storage extent pool in the replica vault and copying the data stored in the third data storage extent to the fourth data storage extent.

34. The system of claim 33 wherein the first MLU is adapted to create, as part of replicating the first MLU to create the third MLU and within the vault tracking module associated with the replica vault, a second vault tracking record by copying the second content identifier stored in the content identifier field associated with the first MLU to the second vault tracking record, to create a second version name within the second vault tracking record to identify the third MLU, and to create an ancestor identifier within the second vault tracking record by copying the first content identifier from the first vault tracking record to the second vault tracking record.

35. The system of claim 22 wherein the first MLU is adapted to include a content identifier field having a first content identifier to identify data stored in the first data storage extent, a redirection indicator to indicate redirection of data accesses directed toward the first MLU to the second MLU stored in the replica vault, and a version identifier field to identify a version identifier for the second MLU.

36. A system for mapped logical unit (MLU) replication, storage, and retrieval in a redundant array of inexpensive disks (RAID) environment, the system comprising:
 (a) a first data storage extent pool representing at least a portion of a RAID array and including at least one data storage extent;
 (b) a replica vault including a second data storage extent pool including at least one data storage extent and representing at least a portion of a RAID array; and
 (c) a first mapped logic unit (MLU) adapted to:
  (i) allocate, in response to a data write operation, a first data storage extent from the first data storage extent pool;
  (ii) store data associated with the first data write operation in the first data storage extent; and
  (iii) replicate the first MLU to create a second MLU by allocating a second data storage extent in a second data storage extent pool in the replica vault and copying the data stored in the first data storage extent to the second data storage extent,
 wherein the first MLU is adapted to include a content identifier field having a first content identifier to identify data stored in the first data storage extent, a redirection indicator to indicate redirection of data accesses directed toward the first MLU to the second MLU stored in the replica vault, and a version identifier field to identify a version identifier for the second MLU, and comprising a vault tracking module associated with the replica vault and wherein the first MLU is adapted to, as part of replicating the first MLU to create a second MLU, create a first vault tracking record by copying the first content identifier stored in the content identifier field associated with the first MLU to the first vault tracking record and to create a first version name within the first vault tracking record to identify the second MLU.

37. The system of claim 36 wherein the first MLU is adapted to, in response to a replica mount operation, set the redirection indicator to indicate that data accesses directed toward the first MLU are to be redirected to an MLU within the replica vault and to copy the first version name from the first vault tracking record to the version identifier field to identify the second MLU as the MLU within the replica vault to which the data accesses directed toward the first MLU are to be redirected.

38. The system of claim 37 wherein the first MLU is adapted to, in response to a first data read operation directed toward the first MLU, retrieve data from the second MLU in the replica vault based upon the redirection indicator and the first version name in the version identifier field within the first MLU.

39. The system of claim 38 wherein the first MLU is adapted to copy data stored in the second data storage extent to the first data storage extent as a background task and, upon completion of the copy, to clear the redirection indicator and the version identifier filed and, in response to a second data read operation directed toward the first MLU, retrieve data from the first data storage extent.

40. The system of claim 39 wherein the first MLU is adapted to copy the content identifier from the first vault tracking record associated with the data copied from the second data storage extent to the first data storage extent to the content identifier field.

41. The system of claim 37 wherein the first MLU is adapted to, in response to a second data write operation, allocate a third data storage extent in the second data storage extent pool in the replica vault and to store data associated with the second data write operation to the third data storage extent.

42. The system of claim 37 wherein the first MLU is adapted to, in response to a second data write operation, allocate a third data storage extent in the first data storage extent pool and to store data associated with the second data write operation to the third data storage extent.

43. A computer program product comprising computer-executable instructions embodied stored in a computer-readable medium for performing steps comprising:
 (a) provisioning a first data storage extent pool representing at least a portion of a RAID array and including at least one data storage extent;
 (b) provisioning a replica vault including a second data storage extent pool including at least one data storage extent and representing at least a portion of a RAID array;
 (c) creating a first mapped logic unit (MLU) for allocating data storage extents from the first data storage extent pool;
 (d) in response to a first data write operation, allocating, using the first MLU, a first data storage extent from the first data storage extent pool and storing data associated with the first data write operation in the first data storage extent;
 (e) replicating the first MLU to create a second MLU by allocating a second data storage extent in the second data storage extent pool in the replica vault and copying the data stored in the first data storage extent to the second data storage extent; and
 (f) after a change to the first MLU, replicating the second MLU to create a third MLU by allocating a third data storage extent in the second data storage extent pool in the replica vault and storing in the third data storage extent the changed portions and not the unchanged portions of the first MLU, wherein the second MLU and the third MLU both point to a data storage extent in the second data storage extent pool that contains an unchanged portion of the data from the first write operation.

* * * * *